(12) United States Patent
Mahfouz et al.

(10) Patent No.: US 12,354,601 B1
(45) Date of Patent: Jul. 8, 2025

(54) USING ARTIFICIAL CREATORS TO GENERATE MEDIA CONTENT

(71) Applicant: Amazon Technologies, Inc., Seattle, WA (US)

(72) Inventors: Ayman Mahfouz, Culver City, CA (US); Pragyana K. Mishra, Seattle, WA (US); Sanjeev Kumar, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 641 days.

(21) Appl. No.: 17/547,927

(22) Filed: Dec. 10, 2021

(51) Int. Cl.
*G10L 15/00* (2013.01)
*G06N 20/20* (2019.01)
(Continued)

(52) U.S. Cl.
CPC .......... *G10L 15/1807* (2013.01); *G06N 20/20* (2019.01); *G10L 13/10* (2013.01); *H04N 21/4394* (2013.01)

(58) Field of Classification Search
CPC .......... G06N 20/20; G06N 20/00; G06N 3/08; G06N 3/044; G06N 3/02; H04N 21/4394; H04N 21/435; G10L 13/033; G10L 13/08; G10L 13/10; G10L 15/1807; G10L 15/18; G10L 13/06; G10L 13/04; G10L 13/027; G10L 13/00; G10L 13/02; G10L 15/26;
(Continued)

(56) References Cited

U.S. PATENT DOCUMENTS 5,832,435 A * 11/1998 Silverman ............... G10L 13/10
704/266
8,023,800 B2 9/2011 Concotelli
(Continued)

FOREIGN PATENT DOCUMENTS

AU 2013204532 B2 11/2014
CA 2977959 A1 9/2016
(Continued)

OTHER PUBLICATIONS

Hoegen, Rens, et al. "An End-to-End Conversational Style Matching Agent." Proceedings of the 19th ACM International Conference on Intelligent Virtual Agents. 2019, pp. 1-8. (Year: 2019).
(Continued)

*Primary Examiner* — Michael Ortiz-Sanchez
(74) *Attorney, Agent, or Firm* — Athorus, PLLC

(57) ABSTRACT

Artificial intelligence agents generate media content for broadcasting to devices of listeners over one or more networks. An agent is trained based on episodes of previously aired media programs to identify topics of the episodes and media entities played during such episodes. Words or phrases spoken by human creators during such episodes are identified and modeled. The agent selects a topic of an episode of a media program and selects media entities that are consistent with those typically played during the media programs. The agent also identifies sets of words that are consistent with the topic, and transmits audio data including the selected media entities and sets of words spoken in voices having linguistic styles, a prosody or acoustic characteristics of the human creators to devices of listeners of the media program.

17 Claims, 20 Drawing Sheets

FEATURES IDENTIFIED FROM AUDIO DATA PROVIDED TO ARTIFICIAL CREATOR

(51) Int. Cl.
*G10L 13/10* (2013.01)
*G10L 15/18* (2013.01)
*H04N 21/439* (2011.01)

(58) Field of Classification Search
CPC ..... G10L 15/063; G10L 25/30; G10L 15/197; G10L 2015/0631; G10L 15/02; G10L 17/04; G10L 25/90; G06F 40/103
See application file for complete search history.

(56) References Cited

U.S. PATENT DOCUMENTS

| | | | |
|---|---|---|---|
| 8,112,720 B2 | 2/2012 | Curtis |
| 8,560,683 B2 | 10/2013 | Funk et al. |
| 8,572,243 B2 | 10/2013 | Funk et al. |
| 8,768,782 B1 | 7/2014 | Myslinski |
| 8,850,301 B1 | 9/2014 | Rose |
| 9,003,032 B2 | 4/2015 | Funk et al. |
| 9,369,740 B1 | 6/2016 | Funk et al. |
| 9,613,636 B2 | 4/2017 | Gibbon et al. |
| 9,706,253 B1 | 7/2017 | Funk et al. |
| 9,729,596 B2 | 8/2017 | Sanghavi et al. |
| 9,781,491 B2 | 10/2017 | Wilson |
| 9,872,069 B1 | 1/2018 | Funk et al. |
| 10,015,589 B1 | 7/2018 | Ebenezer |
| 10,083,169 B1 | 9/2018 | Ghosh et al. |
| 10,091,547 B2 | 10/2018 | Sheppard et al. |
| 10,110,952 B1 | 10/2018 | Gupta et al. |
| 10,135,887 B1 | 11/2018 | Esser et al. |
| 10,140,364 B1 | 11/2018 | Diamondstein |
| 10,178,422 B1 | 1/2019 | Panchaksharaiah et al. |
| 10,178,442 B2 | 1/2019 | Shkedi |
| 10,264,213 B1 | 4/2019 | Sculley |
| 10,313,726 B2 | 6/2019 | Woods et al. |
| 10,356,476 B2 | 7/2019 | Dharmaji |
| 10,432,335 B2 | 10/2019 | Bretherton |
| 10,489,395 B2 | 11/2019 | Lakkur et al. |
| 10,685,050 B2 | 6/2020 | Krishna et al. |
| 10,698,906 B2 | 6/2020 | Hargreaves et al. |
| 10,700,648 B2 | 6/2020 | Lesso |
| 10,719,837 B2 | 7/2020 | Kolowich et al. |
| 10,769,678 B2 | 9/2020 | Li |
| 10,846,330 B2 | 11/2020 | Shilo |
| 10,893,329 B1 | 1/2021 | Trim et al. |
| 10,985,853 B2 | 4/2021 | Bretherton |
| 10,986,064 B2 | 4/2021 | Siegel et al. |
| 10,997,240 B1 | 5/2021 | Aschner et al. |
| 11,141,669 B2 | 10/2021 | Candelore et al. |
| 11,431,660 B1 | 8/2022 | Leeds et al. |
| 11,451,863 B1 | 9/2022 | Benjamin et al. |
| 11,463,772 B1 | 10/2022 | Wanjari et al. |
| 11,521,179 B1 | 12/2022 | Shetty |
| 11,539,845 B1 | 12/2022 | Fowers et al. |
| 11,580,982 B1 | 2/2023 | Karnawat et al. |
| 11,586,344 B1 | 2/2023 | Balagurunathan et al. |
| 11,605,387 B1* | 3/2023 | Muralitharan .......... G10L 15/22 |
| 11,900,902 B2 | 2/2024 | Martinez Ramirez et al. |
| 11,916,981 B1 | 2/2024 | Karnawat et al. |
| 2002/0042920 A1 | 4/2002 | Thomas et al. |
| 2002/0056087 A1 | 5/2002 | Berezowski et al. |
| 2003/0117486 A1 | 6/2003 | Ferren et al. |
| 2004/0057586 A1 | 3/2004 | Licht |
| 2005/0201360 A1 | 9/2005 | Redstone |
| 2005/0213726 A1 | 9/2005 | Rodman |
| 2005/0213734 A1 | 9/2005 | Rodman |
| 2005/0213735 A1 | 9/2005 | Rodman et al. |
| 2006/0018457 A1 | 1/2006 | Unno et al. |
| 2006/0018458 A1 | 1/2006 | McCree et al. |
| 2006/0268667 A1 | 11/2006 | Jellison et al. |
| 2007/0124756 A1 | 5/2007 | Covell et al. |
| 2007/0271518 A1 | 11/2007 | Tischer et al. |
| 2007/0271580 A1 | 11/2007 | Tischer et al. |
| 2008/0086742 A1 | 4/2008 | Aldrey et al. |
| 2009/0044217 A1 | 2/2009 | Lutterbach et al. |
| 2009/0076917 A1 | 3/2009 | Jablokov et al. |
| 2009/0100098 A1 | 4/2009 | Feher et al. |
| 2009/0254934 A1 | 10/2009 | Grammens |
| 2009/0298417 A1 | 12/2009 | Phillips |
| 2010/0088187 A1 | 4/2010 | Courtney et al. |
| 2010/0280641 A1 | 11/2010 | Harkness et al. |
| 2011/0063406 A1 | 3/2011 | Albert et al. |
| 2011/0067044 A1 | 3/2011 | Albo |
| 2011/0267419 A1 | 11/2011 | Quinn et al. |
| 2012/0040604 A1 | 2/2012 | Amidon et al. |
| 2012/0191774 A1 | 7/2012 | Bhaskaran et al. |
| 2012/0304206 A1 | 11/2012 | Roberts et al. |
| 2012/0311444 A1 | 12/2012 | Chaudhri |
| 2012/0311618 A1 | 12/2012 | Blaxland |
| 2012/0331168 A1 | 12/2012 | Chen |
| 2013/0074109 A1 | 3/2013 | Skelton et al. |
| 2013/0247081 A1 | 9/2013 | Vinson et al. |
| 2013/0253934 A1 | 9/2013 | Parekh et al. |
| 2014/0019225 A1 | 1/2014 | Guminy et al. |
| 2014/0040494 A1 | 2/2014 | Deinhard et al. |
| 2014/0068432 A1 | 3/2014 | Kucharz et al. |
| 2014/0073236 A1 | 3/2014 | Iyer |
| 2014/0108531 A1 | 4/2014 | Klau |
| 2014/0123191 A1 | 5/2014 | Hahn et al. |
| 2014/0228010 A1 | 8/2014 | Barbulescu et al. |
| 2014/0325557 A1 | 10/2014 | Evans et al. |
| 2014/0372179 A1 | 12/2014 | Ju et al. |
| 2015/0095014 A1 | 4/2015 | Marimuthu |
| 2015/0163184 A1 | 6/2015 | Kanter et al. |
| 2015/0242068 A1 | 8/2015 | Losey et al. |
| 2015/0248798 A1 | 9/2015 | Howe et al. |
| 2015/0289021 A1 | 10/2015 | Miles |
| 2015/0319472 A1 | 11/2015 | Kotecha et al. |
| 2015/0326922 A1 | 11/2015 | Givon et al. |
| 2016/0027196 A1 | 1/2016 | Schiffer et al. |
| 2016/0093289 A1 | 3/2016 | Pollet |
| 2016/0188728 A1 | 6/2016 | Gill et al. |
| 2016/0217488 A1 | 7/2016 | Ward et al. |
| 2016/0266781 A1 | 9/2016 | Dandu et al. |
| 2016/0291926 A1 | 10/2016 | Hundemer |
| 2016/0293036 A1 | 10/2016 | Niemi et al. |
| 2016/0330529 A1 | 11/2016 | Byers |
| 2017/0127136 A1 | 5/2017 | Roberts et al. |
| 2017/0164357 A1 | 6/2017 | Fan et al. |
| 2017/0193531 A1 | 7/2017 | Fatourechi et al. |
| 2017/0213248 A1 | 7/2017 | Jing et al. |
| 2017/0289617 A1 | 10/2017 | Song et al. |
| 2017/0329466 A1 | 11/2017 | Krenkler et al. |
| 2017/0366854 A1 | 12/2017 | Puntambekar et al. |
| 2018/0025078 A1 | 1/2018 | Quennesson |
| 2018/0035142 A1 | 2/2018 | Rao et al. |
| 2018/0061393 A1* | 3/2018 | Osotio .............. G10L 13/0335 |
| 2018/0184213 A1 | 6/2018 | Lesimple et al. |
| 2018/0205797 A1 | 7/2018 | Faulkner |
| 2018/0227632 A1 | 8/2018 | Rubin et al. |
| 2018/0255114 A1 | 9/2018 | Dharmaji |
| 2018/0293221 A1 | 10/2018 | Finkelstein et al. |
| 2018/0322411 A1 | 11/2018 | Wang et al. |
| 2018/0367229 A1 | 12/2018 | Gibson et al. |
| 2019/0065610 A1 | 2/2019 | Singh |
| 2019/0132636 A1 | 5/2019 | Gupta et al. |
| 2019/0156196 A1 | 5/2019 | Zoldi et al. |
| 2019/0171762 A1 | 6/2019 | Luke et al. |
| 2019/0273570 A1 | 9/2019 | Bretherton |
| 2019/0327103 A1 | 10/2019 | Niekrasz |
| 2019/0364359 A1 | 11/2019 | Ferguson et al. |
| 2019/0385600 A1 | 12/2019 | Kim |
| 2020/0021888 A1 | 1/2020 | Brandao et al. |
| 2020/0106885 A1 | 4/2020 | Koster et al. |
| 2020/0160458 A1 | 5/2020 | Bodin et al. |
| 2020/0226418 A1 | 7/2020 | Dorai-Raj et al. |
| 2020/0279553 A1 | 9/2020 | McDuff et al. |
| 2020/0364727 A1 | 11/2020 | Scott-Green et al. |
| 2021/0090224 A1 | 3/2021 | Zhou et al. |
| 2021/0104245 A1 | 4/2021 | Alas et al. |
| 2021/0105149 A1 | 4/2021 | Roedel et al. |
| 2021/0118426 A1* | 4/2021 | Li ......................... G10L 15/04 |

(56) References Cited

U.S. PATENT DOCUMENTS

| | | | |
|---|---|---|---|
| 2021/0125054 A1 | 4/2021 | Banik et al. | |
| 2021/0160588 A1 | 5/2021 | Joseph et al. | |
| 2021/0210102 A1 | 7/2021 | Huh et al. | |
| 2021/0217413 A1 | 7/2021 | Tushinskiy et al. | |
| 2021/0224319 A1* | 7/2021 | Ingel | G06F 16/686 |
| 2021/0232577 A1 | 7/2021 | Ogawa et al. | |
| 2021/0256086 A1 | 8/2021 | Askarian et al. | |
| 2021/0281925 A1 | 9/2021 | Shaikh et al. | |
| 2021/0366462 A1 | 11/2021 | Yang et al. | |
| 2021/0374391 A1 | 12/2021 | Jorasch et al. | |
| 2021/0407520 A1 | 12/2021 | Neckermann et al. | |
| 2022/0038783 A1 | 2/2022 | Wee | |
| 2022/0159377 A1 | 5/2022 | Wilberding et al. | |
| 2022/0223286 A1 | 7/2022 | Lach et al. | |
| 2022/0254348 A1 | 8/2022 | Tay et al. | |
| 2022/0286748 A1 | 9/2022 | Dyer et al. | |
| 2022/0369034 A1 | 11/2022 | Kumar et al. | |
| 2022/0415327 A1 | 12/2022 | Fowers et al. | |
| 2023/0036192 A1 | 2/2023 | Alakoye | |
| 2023/0085683 A1 | 3/2023 | Turner | |
| 2023/0217195 A1 | 7/2023 | Poltorak | |
| 2024/0031489 A1 | 1/2024 | Lundin et al. | |

FOREIGN PATENT DOCUMENTS

| | | | | |
|---|---|---|---|---|
| CN | 104813305 A | 7/2015 | | |
| DE | 112020002288 T5 * | 2/2022 | ........... | G10L 13/027 |
| KR | 20170079496 A | 7/2017 | | |
| WO | 2019089028 A1 | 5/2019 | | |

OTHER PUBLICATIONS

Arora, S. et al., "A Practical Algorithm for Topic Modeling with Provable Guarantees, " Proceedings in the 30th International Conference on Machine Learning, JMLR: W&CP vol. 28, published 2013 (Year: 2013), 9 pages.

B. Subin, "Spotify for Android Tests New Floating Mini Player UI / Beebom," URL: https://beebom.com/spotify-tests-new-mini-player-android/, retrieved on Aug. 26, 2023, 3 pages.

Matt Ellis, "Desktop vs. mobile app design: how to optimize your user experience—99 designs, " URL: https://99designs.com/blog/web-digital/desktop-vs-mobile-app-design/, retrieved Aug. 26, 2023, 12 pages.

Salesforce, "Introducing a profile page as sleek as a Tableau Public viz," https://www.tableau.com/, Tableau Software, LLC, a Salesforce Company, Jul. 21, 2021. Accessed Aug. 31, 2023. URL: https://www.tableau.com/blog/introducing-profile-page-sleek-tableau-public-viz, 7 pages.

Github, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

Tengeh, R. K., & Udoakpan, N. (2021). Over-the-Top Television Services and Changes in Consumer Viewing Patterns in South Africa. Management Dynamics in the Knowledge Economy. 9(2), 257-277. DOI 10.2478/mdke-2021-0018 ISSN: 2392-8042 (online) www.managementdynamics.ro; URL: https://content.sciendo.com/view/journals/mdke/mdke-overview.XML.

* cited by examiner

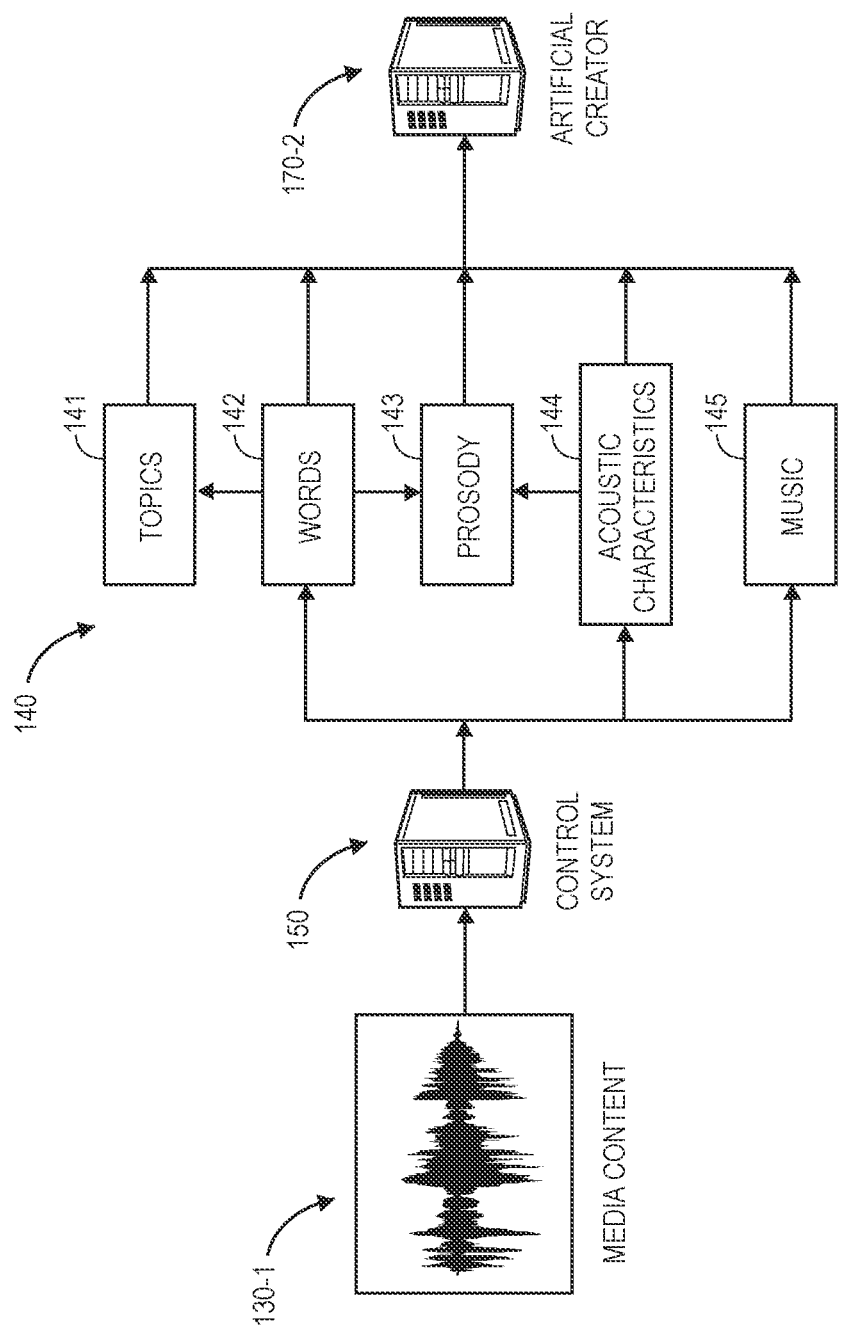

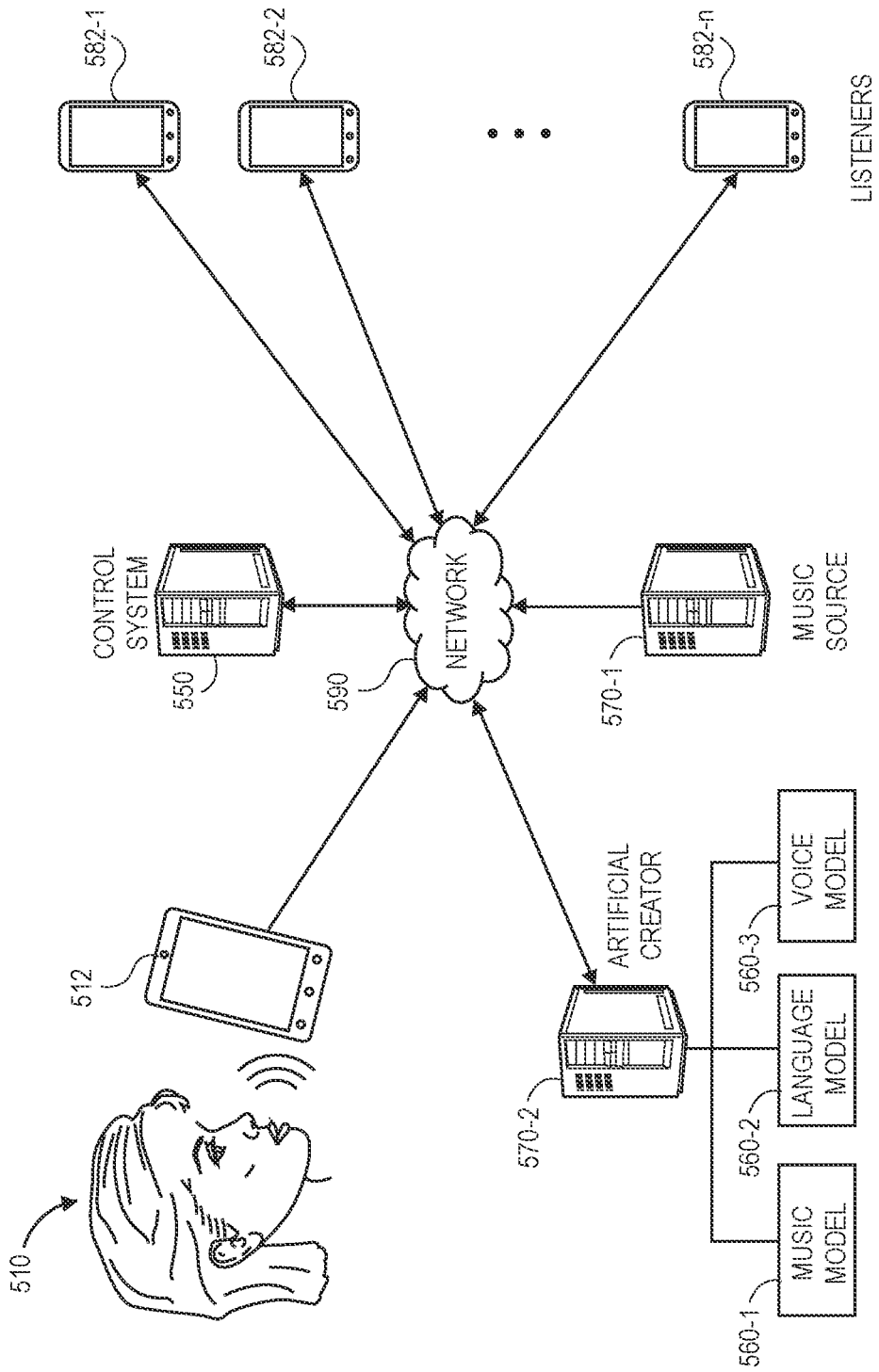

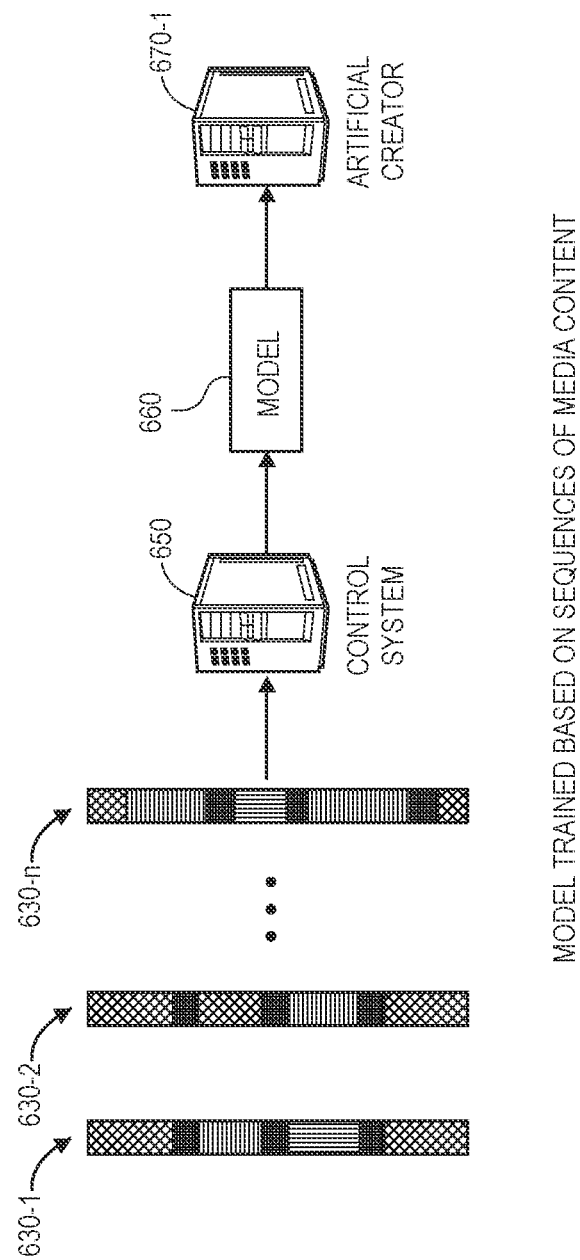

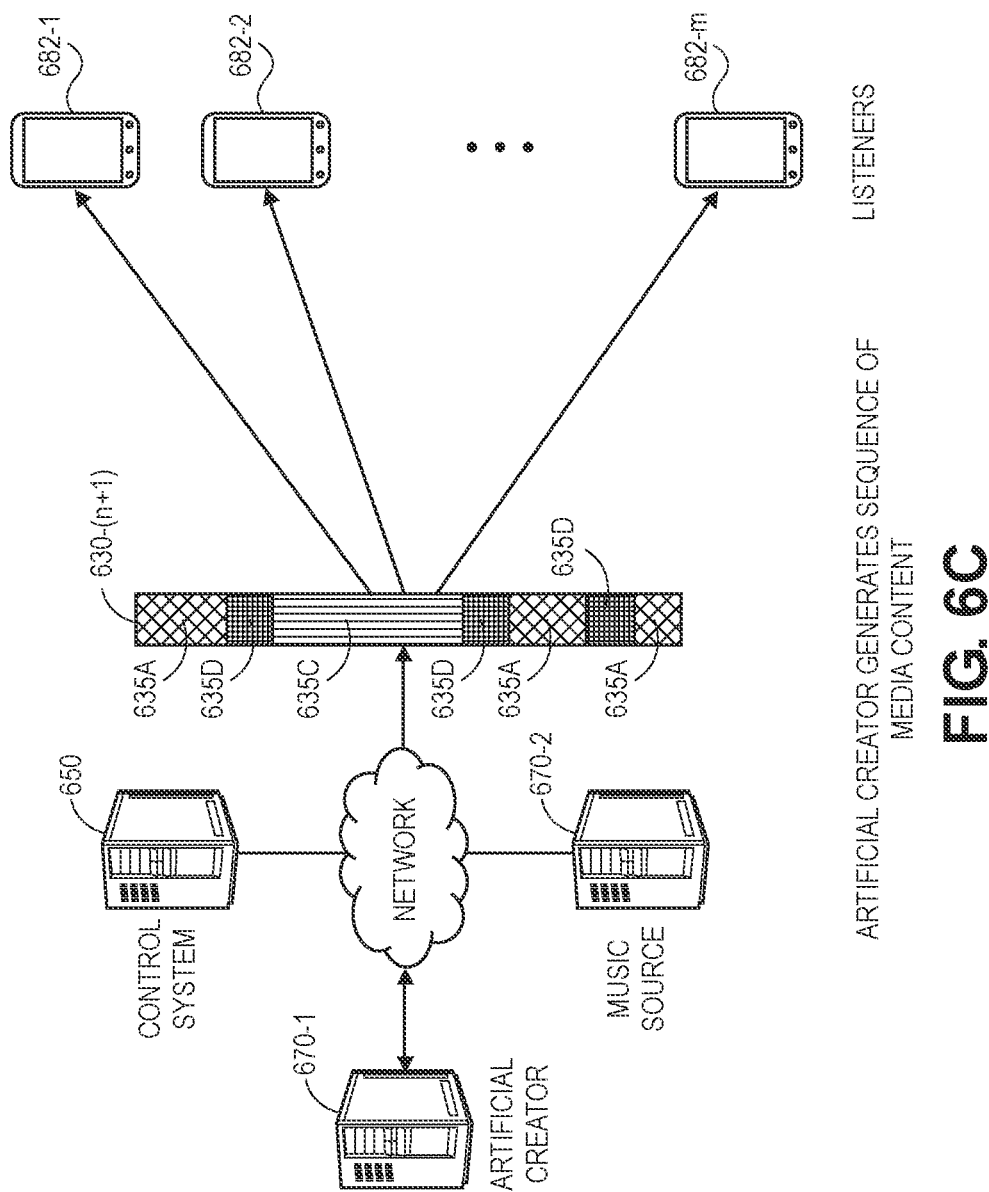

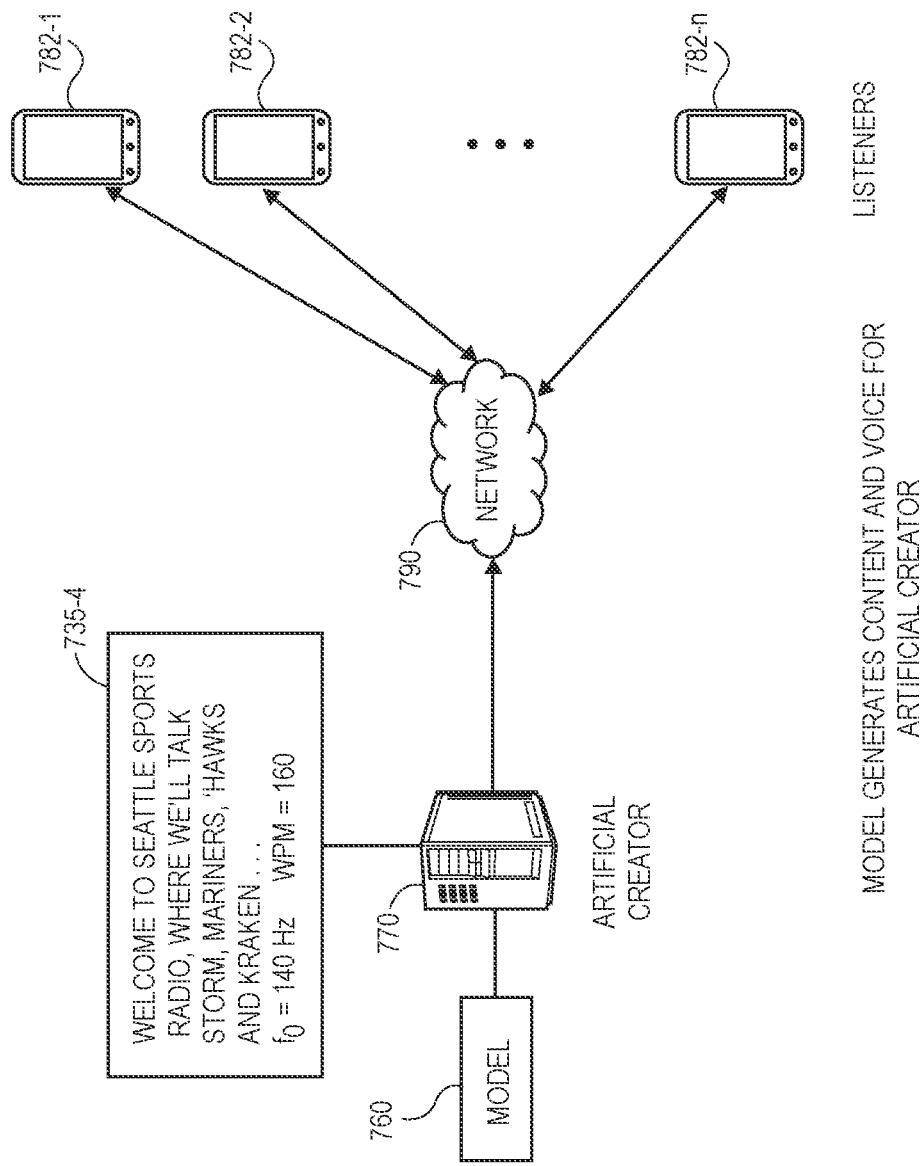

USING ARTIFICIAL CREATORS TO GENERATE MEDIA CONTENT

BACKGROUND

Traditionally, media programs that are broadcast to listeners via radio stations or transmitted via other platforms include media content that is selected by creators of the media programs. A human creator of a media program may elect to speak or sing any number of words or phrases, play media entities (e.g., songs, podcasts or other media), interview guests, engage with listeners or take any other actions at times or for durations of his or her choosing. Likewise, a creator is usually granted the authority or discretion to determine a sequence (or an order) in which media content is to be presented to users.

Every creator typically possesses a unique set of talents and traits, and likewise utilizes his or her unique set of talents and traits to generate or identify media content, and to present that media content to listeners. For example, different creators usually have different backgrounds, experiences or levels of education, and speak with voices having unique linguistic styles and prosodies that are not readily replicated by others.

Creators are not perfect, however, and may be subject to faults or may encounter hindrances that are ordinarily observed or commonly recognized in other humans. For example, a human creator who hosts a media program that features his or her opinions on sports, news, or politics, a media program that discusses or plays music, or a media program that invites commentary from listeners or other guests must remain actively engaged throughout each episode of the media program, e.g., to provide his or her opinions, to cause his or her music selections to be played, or to engage in commentary with listeners or other guests. Where a creator requires a break, takes a vacation, or is unable to generate media content for any other reason, however, the success of the media program is limited on account of the unavailability of the creator.

Moreover, although creators have different backgrounds, experiences or levels of education, and speak with voices having unique linguistic styles and prosodies, where a creator having a specific background, experience or level of education or a specific voice does not exist, the opportunity to generate media content or programs by such a creator is lost.

Furthermore, while many creators work effectively in pairs, e.g., as co-hosts or co-creators of a media program, where the co-hosts or co-creators each possess compatible talents or traits that cooperate in synergy with one another, a creator is typically unable to work in a pair if another creator having talents or traits that are compatible with his or her own does not exist.

BRIEF DESCRIPTION OF THE DRAWINGS

FIGS. 1A through 1G are views of aspects of one system for generating media content in accordance with embodiments of the present disclosure.

FIGS. 5A through 5C are views of aspects of one system for generating media content in accordance with embodiments of the present disclosure.

FIGS. 6A through 6C are views of aspects of one system for generating media content in accordance with embodiments of the present disclosure.

FIGS. 7A and 7B are views of aspects of one system for generating media content in accordance with embodiments of the present disclosure.

DETAILED DESCRIPTION

Figure 1A:
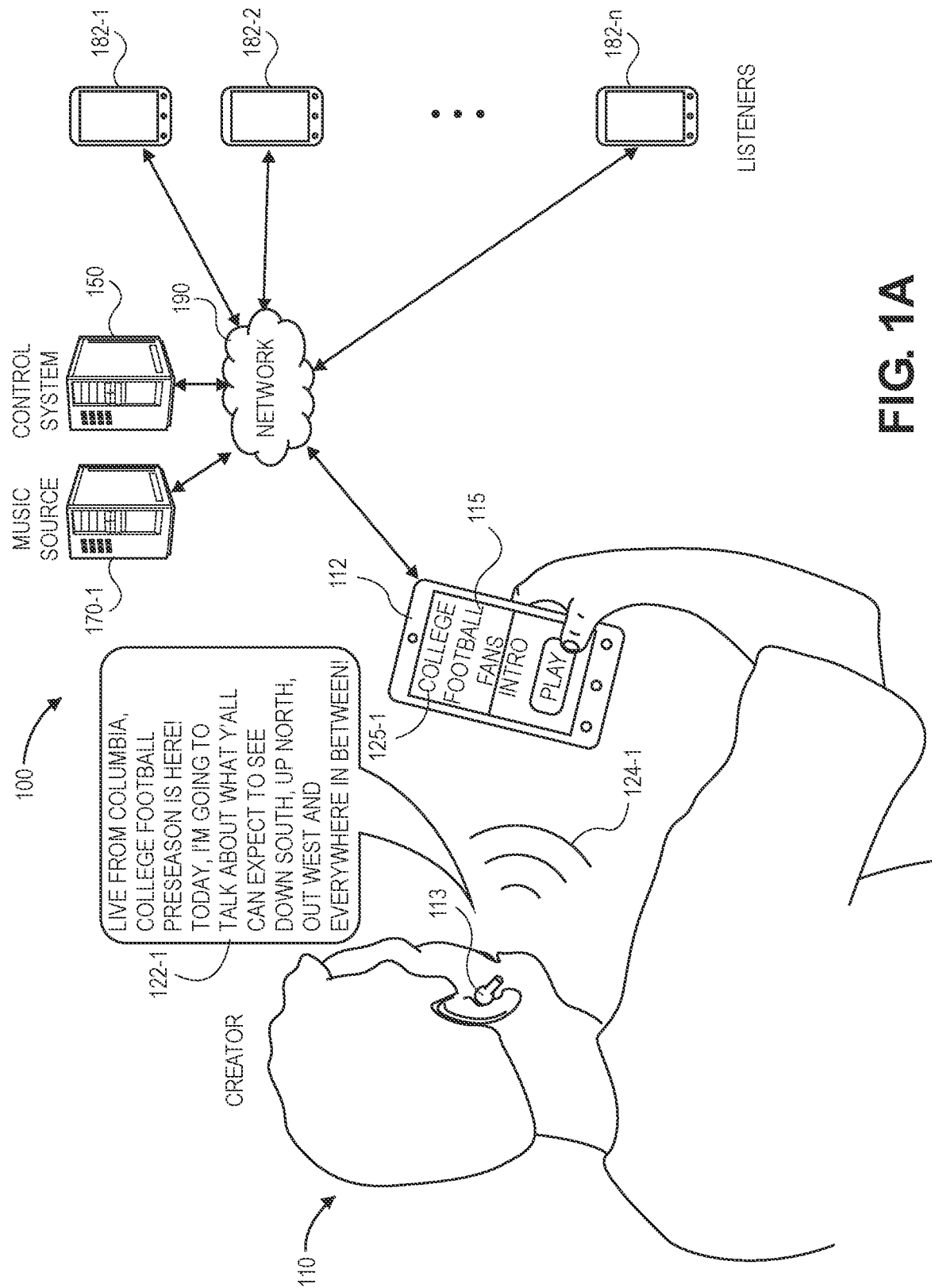

As is set forth in greater detail below, the present disclosure is directed to the use of artificial creators to generate media content, and transmitting the media content to devices of listeners in accordance with one or more media programs. More specifically, some implementations of the present disclosure are directed to processing media content associated with human creators, including but not limited to words that are spoken or sung by the human creators or other participants, as well as media entities (e.g., songs, podcasts or other media) that are selected by the human creators, or any other media content.

For example, an artificial creator may identify a set of words or phrases that is consistent with sets of words or phrases typically uttered by one or more human creators. An artificial creator may also generate audio data for presenting a selected set of words or phrases to listeners in a synthesized voice having one or more attributes or features that are consistent with attributes or features of voices of one or more human creators. An artificial creator may also select one or more media entities (e.g., songs, podcasts or others), based on a topic of a media program, that are consistent with media entities typically selected by one or more human creators. An artificial creator may further establish sequences of media content to be transmitted to devices of listeners to a media program, such as times or durations during which media entities, advertisements, reports (e.g., news, sports or weather), interviews, commentary or other media content are to be transmitted to the devices of listeners, and cause such media content to be transmitted to the devices of listeners in accordance with one or more of such sequences.

An artificial creator of the present disclosure may execute any of the functions or complete any tasks that are ordinarily executed or completed by a human creator. In some implementations, an artificial creator may be programmed or trained to generate or select media content that is consistent with media content typically generated or selected by a human creator, and may thus stand in for the human creator, e.g., when the human creator desires a break for any reason, or when the human creator is temporarily disconnected or unreachable. In some implementations, an artificial creator may be programmed or trained based on multiple human creators, and may be utilized to generate or select media content that is similar to or consistent with media content typically generated or selected by one or more of the human creators.

In some implementations, an artificial creator may be programmed or trained to act as a counterpart to a human creator. The artificial creator may effectively engage in a conversation with the human creator, or complement actions taken by the human creator, by selecting words or phrases in response to words or phrases spoken by the human creator, and in a context of the words or phrases spoken by the human creator. The artificial creator may also generate media content representing the selected words or phrases, e.g., in a voice that has a linguistic style, prosody, or acoustic characteristics that are counterparts to the linguistic style, prosody, or acoustic characteristics of the voice of the human creator.

In some implementations, artificial creators of the present disclosure may be pre-programmed or pre-trained based on media content that was previously generated or selected by human creators, e.g., in one or more back-end processes, and configured to generate or select media content for use in a media program to be aired at a later time. In some implementations, artificial creators of the present disclosure may be programmed or trained to operate in real time or in near-real time, e.g., based on media content generated or selected by a human creator during a media program, and configured to generate or select media content for use in the media program in real time or near-real time.

Referring to FIGS. 1A through 1G, views of aspects of one system for generating media content in accordance with embodiments of the present disclosure are shown. As is shown in FIG. 1A, a system 100 includes a mobile device 112 (e.g., a smartphone, a tablet computer, a laptop computer, or any other system or device) of a creator 110 (e.g., a user, or a host), a control system 150 (e.g., one or more servers or other computer systems), a music source 170-1 (e.g., a catalog, a repository, a streaming service, or another source of songs, podcasts or other media entities) and a plurality of computer devices 182-1, 182-2 . . . 182-n or other systems of any number of listeners (or viewers) that are connected to one another over one or more networks 190, which may include the Internet in whole or in part. The creator 110 wears one or more ear buds 113 (or ear phones, or head phones) or other communication systems or devices which may be in communication with the mobile device 112, and may exchange (e.g., transfer or receive) data relating to audio signals or any other data with the mobile device 112. As is also shown in FIG. 1A, each of the computer devices 182-1, 182-2 . . . 182-n is a mobile device (e.g., a tablet computer, a smart phone, or another like device). Alternatively, the system 100 may include any other type or form of computer devices, e.g., automobiles, desktop computers, laptop computers, media player, smart speakers, televisions, wristwatches, or others. The computer devices that may be operated or utilized in accordance with the present disclosure are not limited by any of the devices or systems shown in FIG. 1A.

As is shown in FIG. 1A, the mobile device 112 includes a display 115 (e.g., a touchscreen) having a user interface 125-1 rendered thereon. The user interface 125-1 may include one or more interactive or selectable elements or features that enable the creator 110 to construct a media program from one or more sets of media content, or to control the transmission or receipt of media content in accordance with the media program, e.g., by the control system 150 or from any other source to the computer devices 182-1, 182-2 . . . 182-n over the networks 190. In some implementations, the control system 150 may establish a two-way or bidirectional channel or connection with the mobile device 112, and one-way or unidirectional channels or connections with each of the computer devices 182-1, 182-2 . . . 182-n and the music source 170-1. In some other implementations, the control system 150 may establish two-way or bidirectional channels with the mobile device 112, and any number of the computer devices 182-1, 182-2 . . . 182-n.

In some implementations, the display 115 may be a capacitive touchscreen, a resistive touchscreen, or any other system for receiving interactions by the creator 110. Alternatively, or additionally, the creator 110 may interact with the user interface 125-1 or the mobile device 112 in any other manner, such as by way of any input/output ("I/O") devices, including but not limited to a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 112, the ear buds 113, or any other systems (not shown). In accordance with implementations of the present disclosure, the user interface 125-1, or other user interfaces, may include any number of buttons, text boxes, checkboxes, drop-down menus, list boxes, toggles, pickers, search fields, tags, sliders, icons, carousels, or any other interactive or selectable elements or features that are configured to display information to the creator 110 or to receive interactions from the creator 110 via the display 115.

As is further shown in FIG. 1A, the creator 110 provides an utterance 122-1 of one or more words that are intended to be heard by one or more listeners using the computer devices 182-1, 182-2 . . . 182-n. In particular, the creator 110 uses the utterance 122-1 to state his or her location, and to describe a media program relating to football in general, and to an upcoming college football season in particular, viz., "Live from Columbia, college football preseason is here! Today, I'm going to talk about what y'all can expect to see down south, up north, out west and everywhere in between!" The mobile device 112 and/or the ear buds 113 may capture audio data 124-1 representing the utterance 122-1 of the creator 110, and transmit the audio data 124-1 to the control system 150 over the one or more networks 190. The control system 150 may then cause data, e.g., some or all of the audio data 124-1, to be transmitted to one or more computer systems or devices of listeners over one or more networks 190, including but not limited to the computer devices 182-1, 182-2 . . . 182-n.

In some implementations, the user interfaces of the present disclosure (viz., the user interface 125-1, or others) may include one or more features enabling the creator 110 to exercise control over media content being played by the computer devices 182-1, 182-2 . . . 182-n of the listeners. For example, such features may enable the creator 110 to manipulate a volume or another attribute or parameter (e.g., treble, bass, or others) of audio signals represented in data transmitted to the respective computer devices 182-1, 182-2 . . . 182-n of the listeners by one or more gestures or other interactions with a user interface rendered on the mobile device 112. In response to instructions received from the mobile device 112 by such gestures or interactions, the control system 150 may modify the data transmitted to the respective computer devices 182-1, 182-2 . . . 182-n of the listeners accordingly.

Alternatively, or additionally, the user interfaces of the present disclosure may include one or more elements or features for playing, pausing, stopping, rewinding or fast-forwarding media content to be represented in data transmitted to the respective computer devices 182-1, 182-2 . . . 182-n. For example, the user interfaces may further include one or more elements or features for initiating a playing of any type or form of media content from any source, and the control system 150 may establish or terminate channels or connections with such sources, as necessary, or modify data transmitted to the respective computer devices 182-1, 182-2 . . . 182-*n* of the listeners to adjust audio signals played by such devices, in response to gestures or other interactions with such elements or features. The user interfaces may further include any visual cues such as "on the air!" or other indicators as to media content that is currently being played, and from which source, as well as one or more clocks, timers or other representations of durations for which media content has been played, times remaining until the playing of media content is expected to end or be terminated, or times at which other media content is to be played.

Figure 1B:
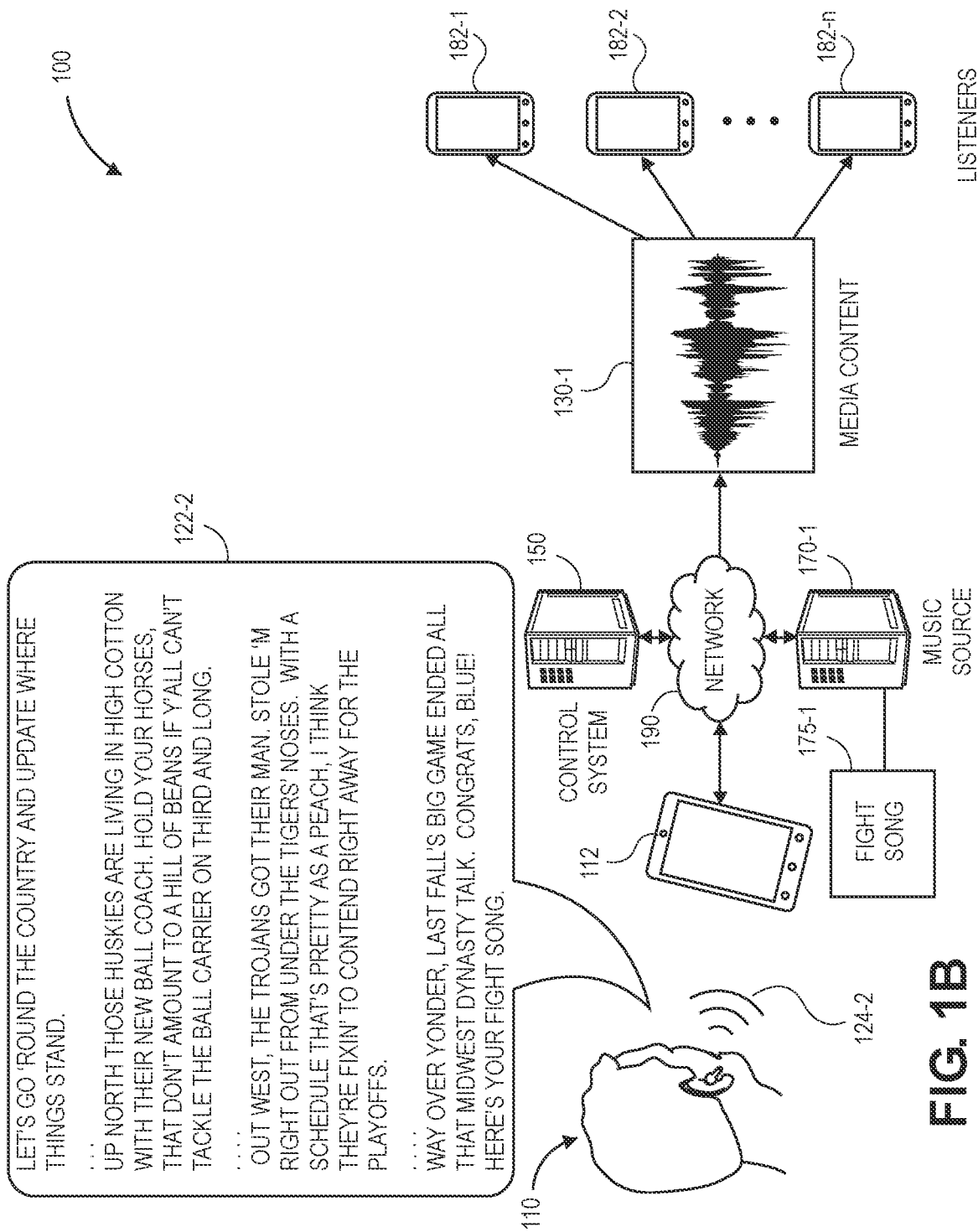

As is shown in FIG. 1B, the creator 110 provides a number of utterances 122-2 to the mobile device 112 in accordance with the media program. In particular, as is shown in FIG. 1B, the creator 110 begins by uttering words or phrases including, "let's go 'round the country and update where things stand," and, later, "up north, those Huskies are living in high cotton with their new ball coach. Hold your horses, that don't amount to a hill of beans if y'all can't tackle the ball carrier on third and long." The creator 110 continues by uttering words or phrases including, "out west, the Trojans got their man. Stole 'm right out from under the Tigers' noses. With a schedule that's pretty as a peach, I think they're fixin' to content right away for the playoffs," and, later, "way over yonder, last fall's big game ended all that Midwest dynasty talk. Congrats, blue! Here's your fight song." Additionally, at the control or request of the creator 110, audio data 175-1 representing one or more media entities, viz., a song referenced or selected by the creator 110, may also be retrieved from the music source 170-1.

Media content 130-1 including at least some of the audio data 124-1, 124-2 representing the utterances 122-1, 122-2 of the creator 110 may be transmitted to devices of listeners, e.g., the computer devices 182-1, 182-2 . . . 182-*n*, in accordance with the media program, or on any other basis. The media content 130-1 may also include at least some of the audio data 175-1 representing media entities identified or selected by the creator 110, which may be retrieved by the control system 150, e.g., from the music source 170-1, and transmitted to the devices of listeners, e.g., the computer devices 182-1, 182-2 . . . 182-*n*.

Additionally, as is shown in FIG. 1C, the control system 150 processes the media content 130-1 transmitted to the computer devices 182-1, 182-2 . . . 182-*n* of the listeners to identify a set of features 140 representative of the media content 130-1, and provides the set of features 140 to an artificial creator 170-2, which may be any type or form of computer device or system (e.g., a server) programmed or otherwise configured to generate or select media content.

For example, as is shown in FIG. 1C, the control system 150 identifies a set of words 142, e.g., one or more words of the utterances 122-1, 122-2, as well as a set of acoustic characteristics 144 of the media content 130-1, and music 145 or other media entities represented in the media content 130-1, which may include the audio data 175-1. For example, the control system 150 may identify the set of words 142 by providing some or all of the media content 130-1 to one or more natural language processing ("NLP") or natural language understanding (or "NLU") processing modules, speech recognition engines or modules, or other processing modules, to identify words represented in the media content 130-1.

The control system 150 may determine the acoustic characteristics 144 of the media content 130-1, such as any fundamental frequencies (or pitches), speech rates, intensities (or amplitudes) of the creator 110 represented therein, or any other characteristics, in any manner. For example, in some implementations, one or more of the acoustic characteristics 144 may be determined by performing a cepstrum analysis on the media content 130-1, to identify any periodic structures of the media content 130-1, or dominant frequencies of the media content 130-1.

The control system 150 may further identify the music 145 or any other media entities, e.g., the audio data 175-1 for playing a fight song or any other music, represented in the media content 130-1. For example, the control system 150 may provide the media content 130-1 to a recognition application trained to match some or all of the media content 130-1 to words (e.g., lyrics) of media entities, or to music (e.g., notes, tempos, beats, rhythms or other characteristics) of media entities, and to identify any media entitles represented in the media content 130-1. Alternatively, in some implementations, where no music or other media entities are represented in the media content 130-1, such as where a media program is a talk radio program, or where a portion of the media program does not include any music, and the audio data includes words that are spoken but not sung, the media content 130-1 need not be processed to identify the music 145.

Additionally, the control system 150 also identifies one or more topics (or themes) 141 of the media content 130-1, e.g., by providing some or all of the media content 130-1, or the set of words 142 or phrases represented therein, to a topic model or other algorithm, system, or technique, e.g., a latent Dirichlet application. The control system 150 may identify one or more sets of keywords representative of the one or more topics (or themes) 141 of the media program based on outputs received from the topic model or the other algorithm, system or technique.

As is further shown in FIG. 1C, the control system 150 identifies one or more attributes of a prosody 143 of the creator 110 during the media program, based on the set of words 142 and the acoustic characteristics 144 represented in the media content 130-1. For example, where the creator 110 generates media content from a discrete location, viz., Columbia, South Carolina, as is shown in FIG. 1A, the creator 110 may speak in a dialect or use one or more sets of words or phrases that are commonly used by humans who are in or from that discrete location. Alternatively, or additionally, the creator 110 may also speak with one or more idiolects, or habits that are unique or substantially peculiar to the creator 110 alone. The prosody 143 may include information or data representing a linguistic style of the creator 110, e.g., speaking patterns of the creator 110, such as observed choices of words, paces, pauses or others, as well as any rhythms, stresses, intonations or other attributes of speech of the creator 110.

Once the set of features 140 have been determined from the media content 130-1, one or more of the features 140 may be provided to any number of machine learning algorithms, systems or techniques to identify other sets of words that are consistent with sets of words typically spoken by the creator 110, viz., the set of words 142, or to generate audio data for presenting the set of words in a synthesized voice that is consistent with a voice of the creator 110. Likewise, one or more of the features 140 may also be provided to one or more machine learning algorithms, systems or techniques that are trained to identify or select media entities that are consistent with media entities ordinarily identified or selected by the creator 110.

Figure 1D:
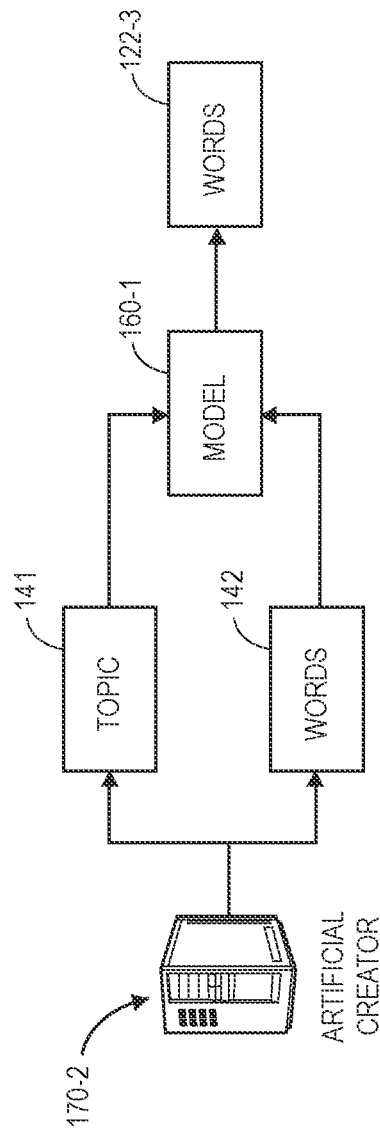

For example, as is shown in FIG. 1D, the artificial creator 170-2 may provide the topic 141 and/or the set of words 142 to a model 160-1 trained to generate a set of words 122-3 or phrases that are consistent with or similar to words or phrases uttered by the creator 110 based on topics of media content or words uttered by the creator 110.

Figure 1E:
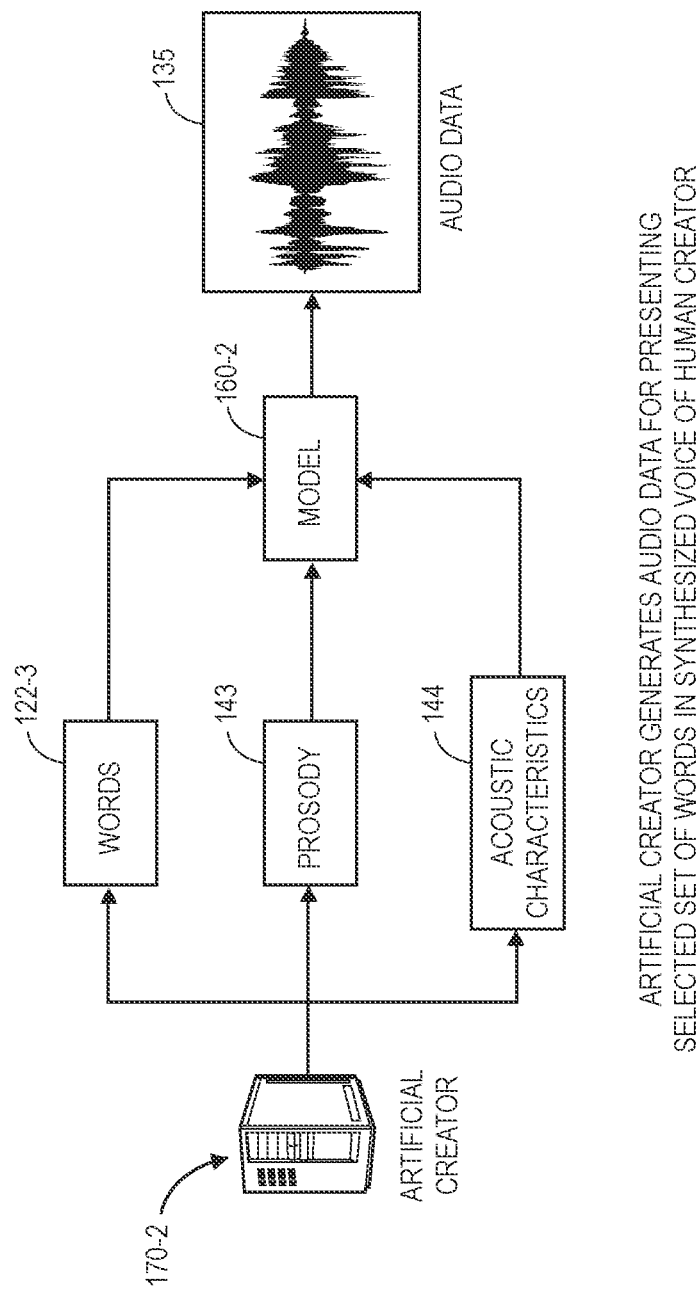

Additionally, as is shown in FIG. 1E, the artificial creator 170-2 may further provide the set of words 122-3 or phrases along with information or data regarding the prosody 143 of the creator 110, or the acoustic characteristics 144 of the creator 110, to a model 160-2 that is trained to generate audio data 135 or other media content representing the set of words 122-3 spoken in a synthesized voice that is similar to or consistent with a voice of the creator 110. For example, the audio data 135 may represent the set of words 122-3 with intensities that are similar to intensities of the voice of the creator 110, and with frequencies that are within the same or similar frequency ranges of the voice of the creator 110.

Figure 1F:
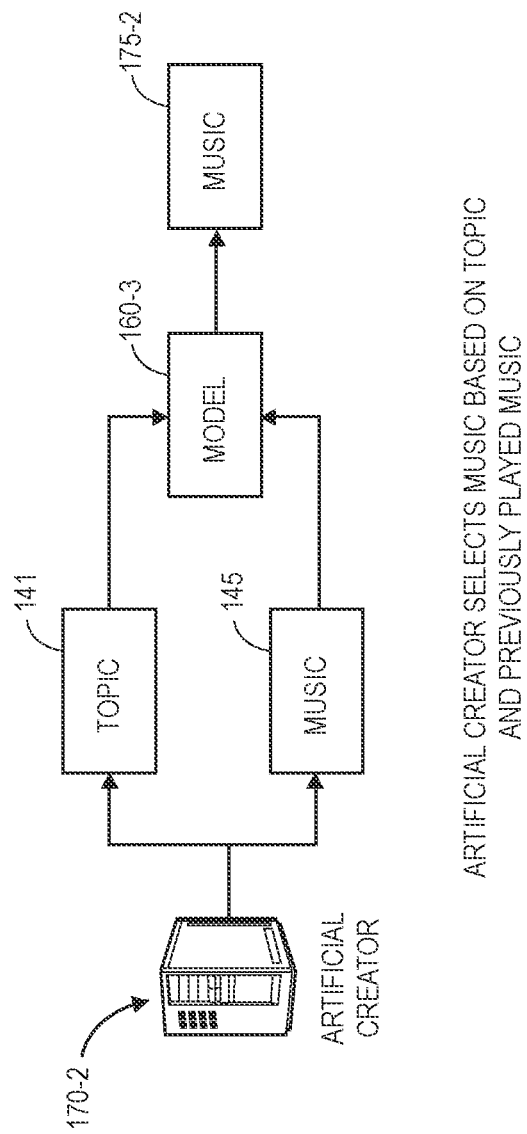

As is further shown in FIG. 1F, the artificial creator 170-2 may provide information or data regarding the topic 141 and the music 145 to a model 160-3 that is trained to identify music 175-2 or other media entities based on topics of media content or music or other media entities played by the creator 110.

The models 160-1, 160-2, 160-3 may be any type or form of machine learning algorithms, systems or techniques including but not limited to artificial neural networks such as generative adversarial networks, recurrent neural networks or convolutional neural networks. Alternatively, such machine learning algorithms, systems or techniques may include, but need not be limited to, one or more transformers such as a bidirectional encoder representation from transformers, or any other machine learning algorithm, system or technique.

In some implementations, the artificial creator 170-2 may stand in for a human creator, e.g., the creator 110, on a short-term or long-term basis. For example, where the creator 110 requires a break of any duration, or is unable or unavailable to generate media content for any other reason, the artificial creator 170-2 may identify or select media entities that are consistent with media entities that would have been identified or selected by the creator 110, and cause audio data representing such media entities to be transmitted to the computer devices 182-1, 182-2 . . . 182-n of the listeners. Similarly, the artificial creator 170-2 may also identify or select sets of words or phrases that are consistent with or similar to words or phrases typically uttered by the creator 110, and generate audio data for presenting the sets of words or phrases in a synthesized voice having a linguistic style, a prosody or acoustic characteristics that are consistent with or similar to a linguistic style, a prosody or acoustic characteristics of a voice of the creator 110. Moreover, the artificial creator 170-2 may also identify or generate a sequence of media content to be presented via the computer devices 182-1, 182-2 . . . 182-n of the listeners, e.g., one or more media entities, advertisements, reports (e.g., news, sports or weather), interviews with guests or other participants, or commentary, and cause audio data representing the media content to be transmitted to the computer devices 182-1, 182-2 . . . 182-n of the listeners in the sequence during a media program.

Figure 1G:
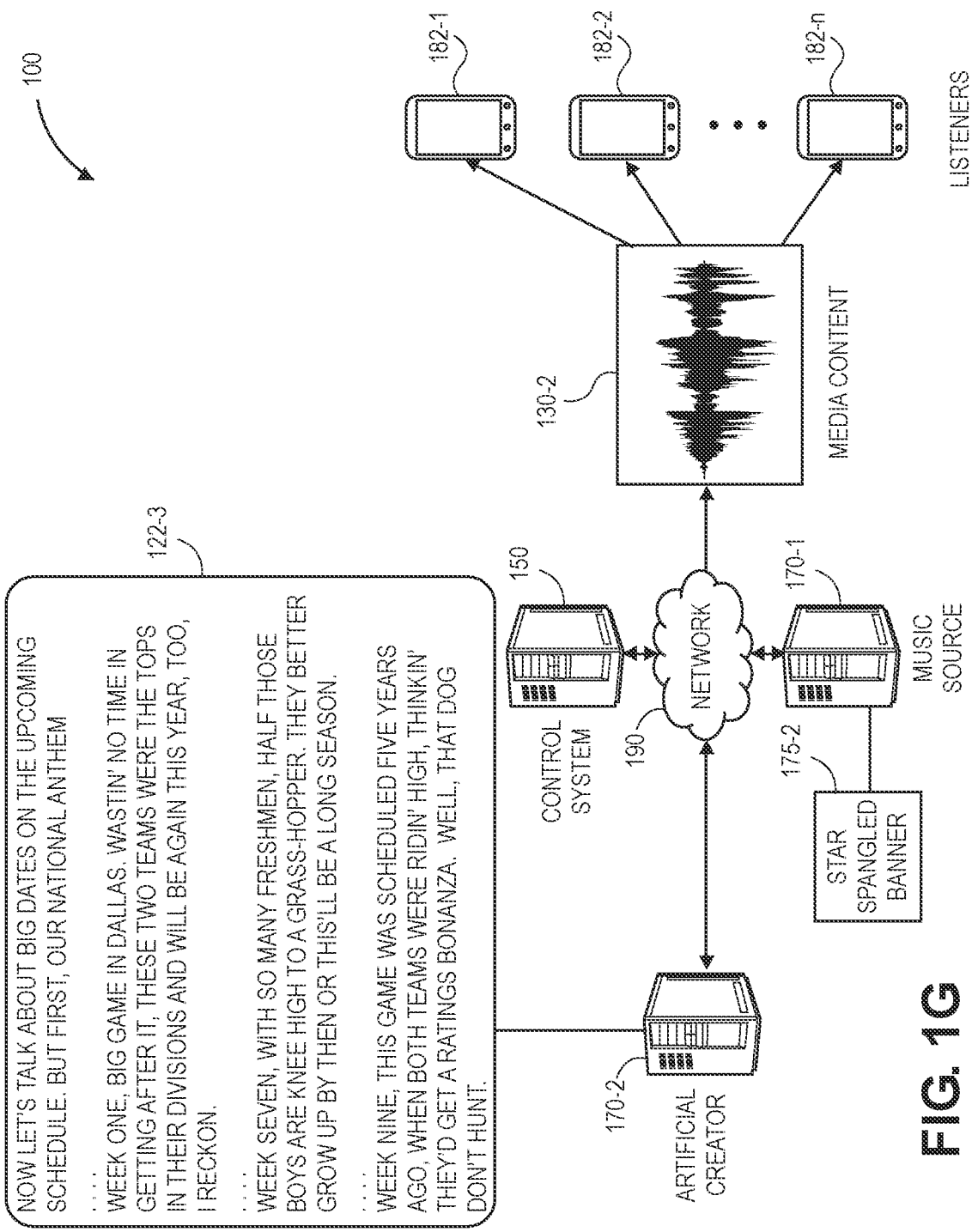

As is shown in FIG. 1G, the control system 150 causes media content 130-2 including the audio data 135 representing the set of words 122-3 in the synthesized voice of the creator 110 generated by the artificial creator 170-2 and the audio data 175-2 representing the music identified by the artificial creator 170-2 to be transmitted to the computer devices 182-1, 182-2 . . . 182-n of the listeners. The set of words 122-3 represented in the media content 130-2 includes "now let's talk about big dates on the upcoming schedule. But first, our national anthem," as well as "week one, big game in Dallas. Wastin' no time in getting after it, these two teams were the tops in their divisions and will be again this year, too, I reckon." The set of words 122-3 also includes "week seven, with so many freshmen, half those boys are knee high to a grasshopper. They better grow up by then or this'll be a long season," followed by "week nine, this game was scheduled five years ago, when both teams were ridin' high, thinkin' they'd get a ratings bonanza. Well, that dog don't hunt." The media content 130-2 also includes the audio data 175-2 representing a song selected by the creator 110, viz., the Star Spangled Banner. The media content 130-2 received from the music source 170-1 or the artificial creator 170-2 by the control system 150 is then transmitted to the computer devices 182-1, 182-2 . . . 182-n, in accordance with the media program.

When received and played by the computer devices 182-1, 182-2 . . . 182-n, the media content 130-2 represents the set of words 122-3 or phrases in a synthesized voice having a linguistic style, a prosody and acoustic characteristics that are consistent with or similar to a linguistic style, a prosody or acoustic characteristics of the voice of the creator 110, or in a voice having any other linguistic style, prosody or acoustic characteristics. Likewise, the media content 130-2 also represents a song that is consistent with media entities typically identified or selected by the creator 110. Moreover, the artificial creator 170-2 may elect to play the media content 130-2 in any order or sequence, e.g., the audio data 135 representing the set of words 122 in the synthesized voice prior to the audio data 175-2 representing the selected media entity, or vice versa.

Accordingly, the systems and methods of the present disclosure are directed to the use of artificial intelligence agents that may execute voice synthesis applications, conversational agents or other applications to mimic the talents or traits of actual media personalities, e.g., human creators, or to create artificial or synthetic media personalities having unique talents or traits, e.g., artificial creators, and to generate media content including words that are spoken or sung having synthesized voices of the human creators or representing media entities to be played during media programs.

The artificial intelligence agents of the present disclosure may consist of any number of components, modules or systems that may be programmed or trained to generate media content of any type or form, and the media content may be utilized for any desired purpose. In some implementations, an artificial intelligence agent may operate or utilize an analysis and training component that receives and processes or analyzes media content generated during media programs of any type or form, e.g., live or in a previously recorded format, or otherwise made available to listeners. An analysis and training component may include a topic recognizer (or a program recognizer), a music selection analyzer, a language and dialog modeler, a linguistic style or prosody extractor, or others.

In some implementations, an artificial intelligence agent may also operate or utilize a generative component that generates sequences of media content to be aired in accordance with a media program or otherwise made available to listeners. For example, the sequences may include media content in the form of words or phrases that are spoken or sung, as well as media entities (e.g., songs, podcasts or others), or any other content, and the media content identified by the artificial intelligence agent may be transmitted to devices of listeners in accordance with such sequences. Where the media content includes words or phrases that are spoken or sung, such words or phrases may be generated based on words or phrases that are typically spoken or sung by one or more human creators, and generated in voices having linguistic styles, prosodies or acoustic characteristics of the voices of the human creators.

The artificial intelligence agents of the present disclosure may be utilized to create media content of any type or form, and in voices having any desired linguistic styles, prosodies or acoustic characteristics. In some implementations, an artificial creator that is programmed or trained to have a voice with a linguistic style, a prosody or acoustic characteristics that are the same as or similar to linguistic styles, prosodies or acoustic characteristics of a voice of a human creator, or to generate media content that is similar to media content generated by the human creator, may effectively stand in for the human creator, such as when the human creator desires a break for any reason, or when the human creator is temporarily disconnected or unreachable by a control system. For example, in some implementations, a cepstrum analysis of media content (e.g., an inverse Fourier transform of a logarithm of an estimated spectrum of audio data representing the media content) including words spoken by a human creator may be performed to determine acoustic characteristics of the media content, e.g., periodic structures of the media content, or dominant frequencies of the media content, and such acoustic characteristics may be utilized to generate a synthesized voice of the human creator. Media content representing words or phrases that are similar to words or phrases typically spoken or sung by the creator may be transmitted to devices of listeners to an episode of a media program, e.g., over one or more networks, in lieu of or along with media content representing words or phrases spoken or sung by the creator.

In some other implementations, an artificial creator may be specifically programmed or trained to generate media content of a desired type or form, and in a desired voice, based on media content generated by one or more human creators, and linguistic styles, prosodies or acoustic characteristics of voices of such human creators. For example, an artificial creator may be trained or configured to assume a voice of a celebrity, a personality, or any other human, living or dead, and may be programmed to generate media content similar to media content currently or previously generated by that human, and in a voice having linguistic styles, prosodies or acoustic characteristics of the voice of that human. An artificial creator may also be an entirely new personality, not based on any single human creator, that is programmed or trained to generate media content of a desired type or form, and in a voice having a specific linguistic style, a specific prosody, or specific acoustic characteristics.

In some other implementations, an artificial creator may be specifically programmed or trained to act as a counterpart to a specific human creator. For example, where words or phrases that are typically uttered by a human creator are known, along with a linguistic style, a prosody or acoustic characteristics of a voice of the human creator, an artificial creator may be programmed or trained to generate media content that is consistent with, or complements, media content generated by the human creator, and in a voice having a linguistic style, a prosody or acoustic characteristics that are likewise consistent with, or complement, a voice of the human creator. The linguistic style, the prosody or the acoustic characteristics of the artificial creator may be determined by identifying data representing the voice of the human creator, e.g., by a cepstrum analysis, and modifying the data to cause the synthesized voice to have a desired linguistic style, a desired prosody or desired acoustic characteristics. The synthesized voice may thus be similar but not identical to the human voice, in terms of linguistic style, prosody or acoustic characteristic, or substantially different from the human voice.

Media content that is received from any source and transmitted to devices of users (e.g., creators, listeners or others) may be processed according to any machine learning algorithms, systems or techniques in order to transcribe or otherwise identify words uttered within such media content, or to determine any other features (e.g., audio features) of the media content.

In some implementations, audio data including or representing media content may be processed by one or more NLP or NLU processing modules, a speech recognition engine or module, or another processing module, to identify words represented in the audio data. For example, one or more computer devices or systems may transform audio data for processing by a speech recognition engine or module, which may compare the data to one or more acoustic models, language models or other data models to recognize any words incorporated in the audio data. In some implementations, data captured by a device or received from any source may be processed, e.g., by an acoustic front end, to reduce noise or be divided into frames representing one or more intervals of time for which values or features representing qualities of the data, along with a vector of such values or features, may be determined, e.g., by one or more mel-frequency cepstral coefficients (or "MFCCs"), perceptual linear predictive (or "PLP") techniques, neural network feature vector techniques, linear discriminant analysis, semi-tied covariance matrices, or any other approaches known to those of skill in the art.

In some implementations, a speech recognition engine (or module) may further process outputs of an acoustic front end by reference to information or data stored in a speech model storage. In some other implementations, a speech recognition engine may attempt to match audio features, or feature vectors, to phonemes or words identified by or stored in association with one or more acoustic models, language models, or other models. In some implementations, a speech recognition engine may also compute one or more values or scores for such feature vectors based on any information, data or metadata regarding the audio data, such an acoustic score representing a likelihood that a sound represented by a group of feature vectors matches a language phoneme. Additionally, a speech recognition engine or module may use any number of techniques to match feature vectors to phonemes, e.g., Hidden Markov Models (or "HMM") to determine probabilities of matches between feature vectors and one or more phonemes. Speech recognition modules or engines may operate on any number of devices, including but not limited to a device that captures audio data, e.g., a device associated with a creator. Results identified by a speech recognition module or engine may be provided to one or more other components, in the form of a single textual representation of speech included in audio data, a list of any number of hypotheses and respective scores, or any other representation.

In some implementations, one audio feature that may be identified from audio data using one or more machine learning algorithms, systems or techniques, may include a topic (or a theme) identified from a set of words included in utterances received from creators, listeners or other participants in a media program. The topic (or theme) may be identified in any manner, e.g., by one or more topic modeling algorithms or methods such as one or more latent Dirichlet allocations, matrix factorizations, latent semantic analyses, pachinko allocation models, transformers (e.g., a bidirectional encoder representation from transformers) or others. In some implementations, a topic (or a theme) may be identified by counting words (including any known synonyms) appearing within a set of words, or defining groups of the words that best represent the set. In some implementations, a topic (or a theme) may be identified based on an extent to which words are repeated within a set of words, or a frequency with which such words appear within the set of words, as well as how such words are used within individual portions of a media program or the set of words as a whole. A topic (or a theme) may also be identified by comparing and contrasting different portions of a set of words, e.g., portions spoken by different speakers (e.g., creators, listeners or other participants), or based on text not actually included within the set of words. A topic (or a theme) may also be identified based on any metaphors or analogies included within a set of words as a whole, as well as based on any transitions or connections between any portions of the set of words.

Additionally, in some implementations, a topic (or a theme) may be identified or designated by a creator, a listener or another individual. Alternatively, a topic (or a theme) may be identified from a set of words, on any other basis. Furthermore, a topic (or a theme) may be identified at any point in time and from any portion of media content. Topics (or themes) may be identified based on any words spoken by any participants (e.g., creators or listeners) in a media program, or based on words spoken by all of the participants in the media program. Tags or descriptions of the topics of discussion may be automatically generated, or selected by a creator or another speaker identified during the media content.

As used herein, the term "media entity" may refer to media content of any type or form (e.g., audio and/or video) that may be recorded, stored, maintained or transmitted in one or more files, such as a movie, podcast, a song (or title), a television show, or any other audio and/or video programs. The term "media entity" may also refer to a descriptor of media content, e.g., an era, a genre, or a mood, or any other descriptor of one or more audio and/or video programs. The term "media entity" may further include a file including information, data or metadata regarding one or more sets of media content, or a physical or virtual representation of the one or more sets of media content, such as an album, a playlist, a soundtrack, or any other information, data, metadata, or representations. The term "media entity" may also include one or more persons or entities associated with such media content, e.g., an artist, a group, a label, a producer, a service, a station, or any other persons or entities.

Media content that may be included in a media program includes, but need not be limited to, one or more media entities from a music catalog, repository or streaming service, one or more advertisements of items, goods or services, or one or more news, sports or weather programs, which may be live or previously recorded, as well as words spoken by a human creator or one or more guests, such as musicians, celebrities, personalities, athletes, politicians, or artists, or any listeners to the media program. A control system, or any associated conference systems, broadcast systems or mixing systems, may establish or terminate connections with a human creator, with any sources of media content, or with any number of listeners, to compile and efficiently transmit the media program over digital channels (e.g., web-based or application-based), to any number of systems or devices of any form. Media content that may be included in a media program may also represent words or phrases generated by an artificial creator, e.g., using one or more machine learning models (or algorithms, systems or techniques), and such words or phrases may be represented in a voice having a linguistic style, a prosody or one or more other acoustic characteristics that is programmed or trained based on voices (e.g., linguistic styles, prosodies or acoustic characteristics) of one or more human creators.

One or more of the embodiments disclosed herein may overcome limitations of existing systems and methods for presenting media programs or other content, e.g., radio programs, to listeners. Unbounded by traditional frequency bands or broadcast protocols, the systems and methods of the present disclosure may receive designations of media content from a creator of a media program, e.g., in a broadcast plan, and the media program may be transmitted over one or more networks to any number of listeners in any locations and by way of any devices. Creators of media programs may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-day communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called WebSocket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), or operates over standard HTTP, and is a novel use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific media entity, to insert a specific advertisement, or to take any other relevant actions, such as to adjust a volume or another attribute or parameter of media content. Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
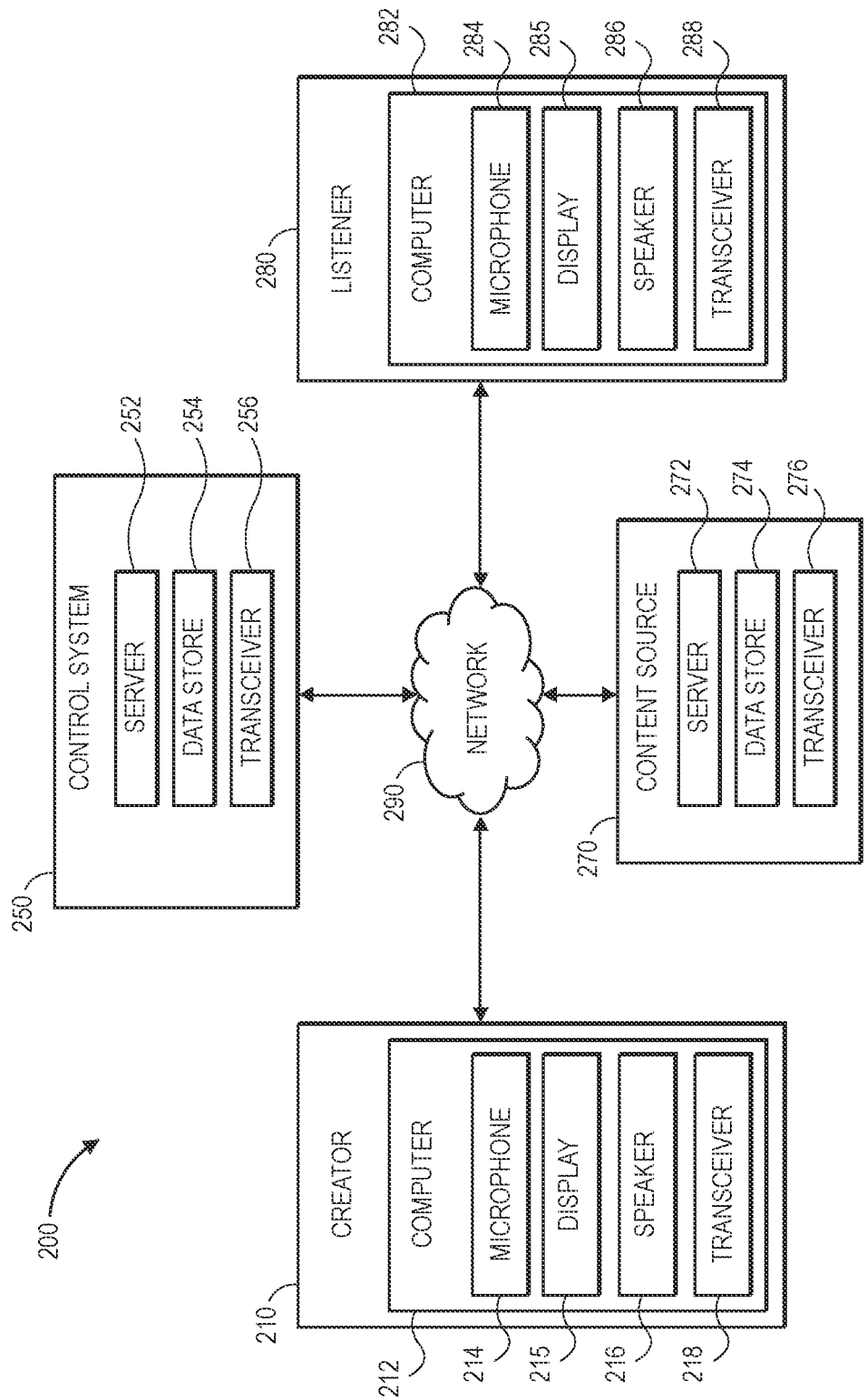
FIGS. 2A and 2B are block diagrams of components of one system for generating media content in accordance with embodiments of the present disclosure.
Figure 2B:
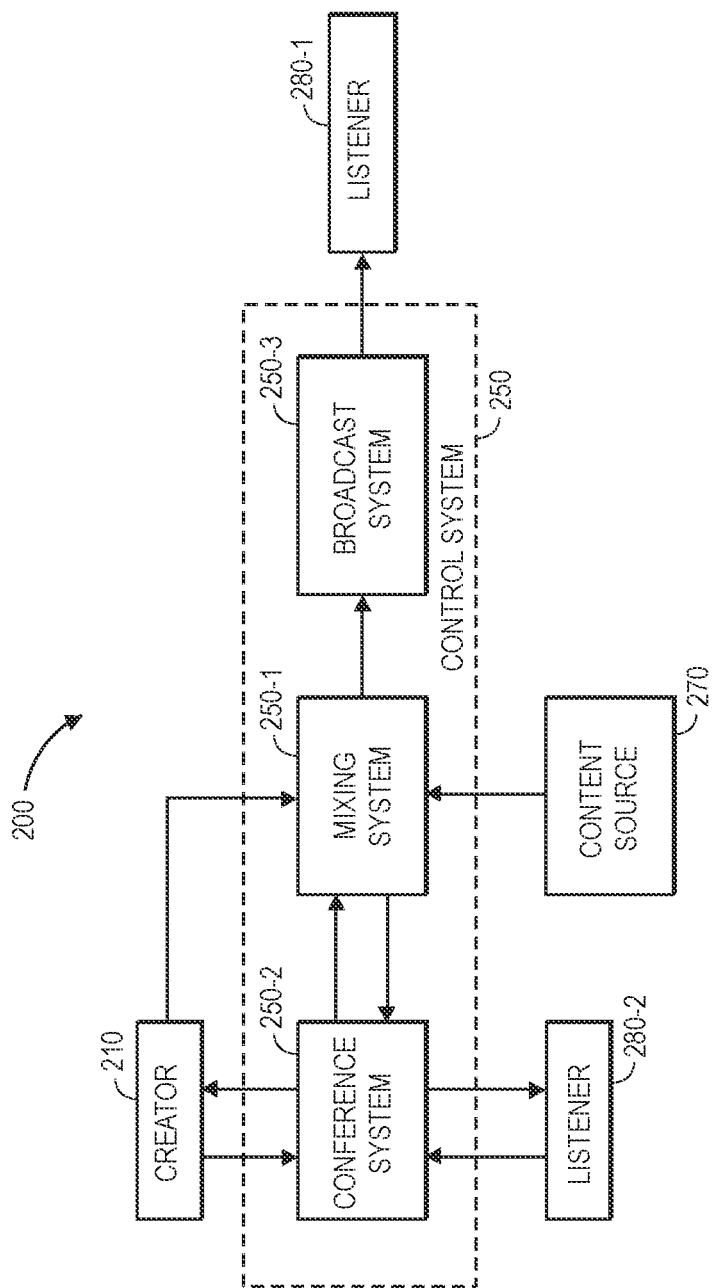

Referring to FIGS. 2A and 2B, block diagrams of components of one system 200 for generating media content in accordance with embodiments of the present disclosure is shown. Except where otherwise noted, reference numerals preceded by the number "2" shown in FIG. 2A or FIG. 2B indicate components or features that are similar to components or features having reference numerals preceded by the number "1" shown in FIGS. 1A through 1G.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, such as the ear buds 113 of FIG. 1A, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fees. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the content sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one content source 270, one listener 280, and one network 290, those of ordinary skill in the pertinent arts will recognize that any number of creators 210, broadcast systems 250, content sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A, or perform all or fewer of the tasks or functions described herein. Tasks or functions described as being executed or performed by a single system or device associated with the creator 210, the control system 250, the content source 270 or the listener 280 may be executed or performed by multiple systems or devices associated with each of the creator 210, the control system 250, the content source 270 or the listener 280. For example, the tasks or functions described herein as being executed or performed by the control system 250 may be performed by a single system, or by separate systems for establishing two-way connections with the creator 210 or any number of content sources 270, or any other systems, e.g., a mixing system, or for establishing one-way connections with any number of content sources 270 or any number of listeners 280 and transmitting data representing media content, e.g., a broadcast system, from such content sources 270 to such listeners 280. Moreover, two or more creators 210 may collaborate on the construction of a media program.

In some implementations, one or more of the tasks or functions described as being executed or performed by the control system 250 may be performed by multiple systems. For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized host, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference channel 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributers or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 to each of such listeners 280-1.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features, including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, or the broadcast system 250-3), the content source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, or the broadcast system 250-3), the content source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
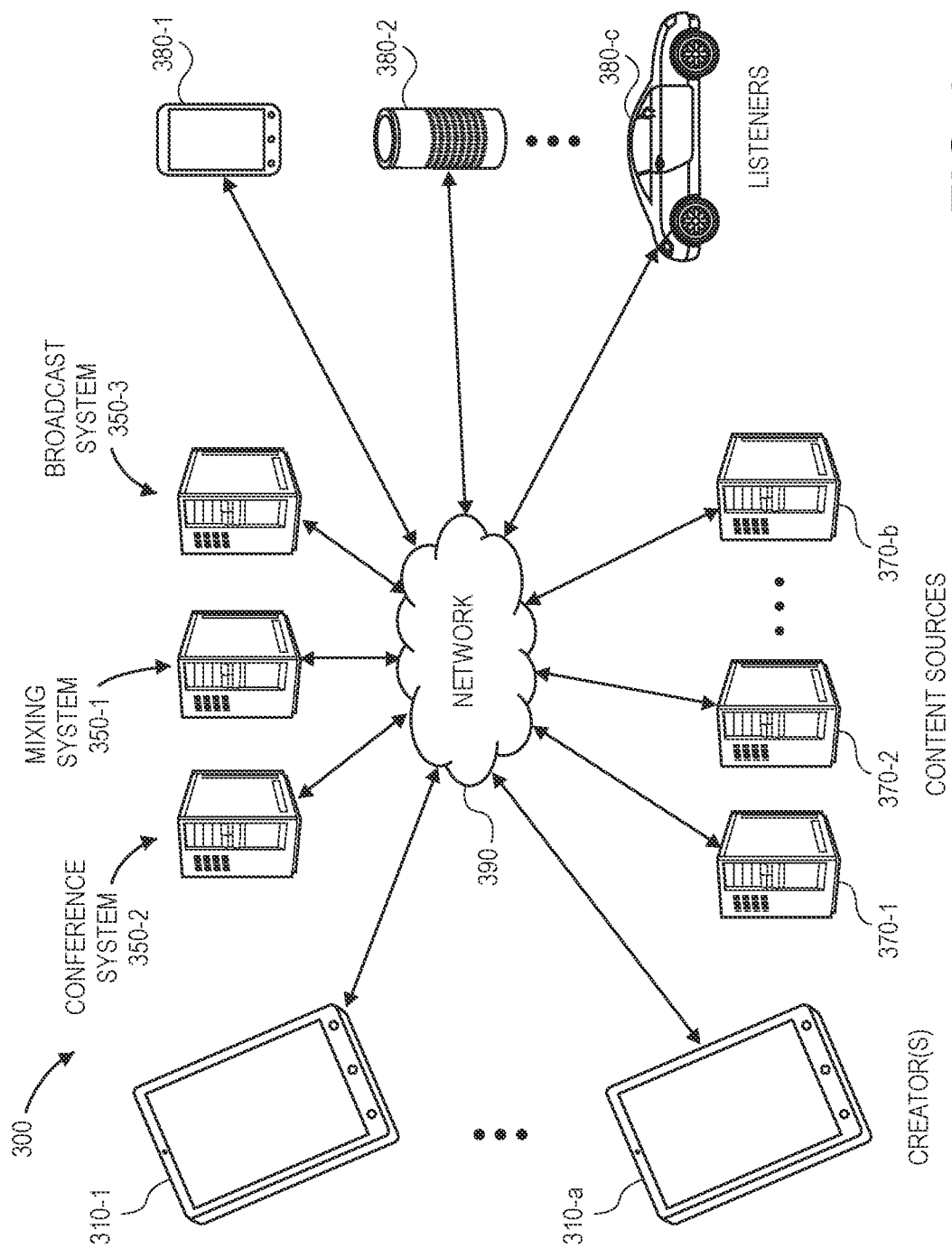
FIG. 3 is a view of aspects of one system for generating media content in accordance with embodiments of the present disclosure.

Referring to FIG. 3, a view of aspects of one system for generating media content in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A or FIG. 2B or by the number "1" shown in FIGS. 1A through 1G. As is shown in FIG. 3, the system 300 includes computer systems or devices of a plurality of creators 310-1 . . . 310-a, a mixing system 350-1, a conference system 350-2, a broadcast system 350-3, a plurality of content sources 370-1, 370-2 . . . 370-b and a plurality of listeners 380-1, 380-2 . . . 380-c that are connected to one another over a network 390, which may include the Internet in whole or in part.

The creators 310-1 . . . 310-a may operate a computer system or device having one or more microphones, an interactive display, one or more speakers, one or more processors and one or more transceivers configured to enable communication with one or more other computer systems or devices. In some implementations, the creators 310-1 . . . 310-a may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-a may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . 310-a, or any of the listeners 380-1, 380-2 . . . 380-c, e.g., by way of the conference system 350-2, or from any of the content sources 370-1, 370-2 . . . 370-b over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-c, in accordance with a broadcast plan (or a sequence of media content, or another schedule), or at the direction of the creators 310-1 . . . 310-a. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-a.

In some implementations, the mixing system 350-1 may receive media content from one or more of the content sources 370-1, 370-2 . . . 370-b, and cause the media content to be transmitted to one or more of the creators 310-1 . . . 310-a or the listeners 380-1, 380-2 . . . 380-c by the broadcast system 350-3. In some other implementations, the mixing system 350-1 may receive media content from one or more of the content sources 370-1, 370-2 . . . 370-b, and mix, or combine, the media content with any media content received from the creators 310-1 . . . 310-a or any of the listeners 380-1, 380-2 . . . 380-c, before causing the media content to be transmitted to one or more of the creators 310-1 . . . 310-a or the listeners 380-1, 380-2 . . . 380-c by the conference system 350-2 or the broadcast system 350-3. For example, in some implementations, the mixing system 350-1 may receive media content (e.g., audio content and/or video content) captured live by one or more sensors of one or more of the content sources 370-1, 370-2 . . . 370-b, e.g., cameras and/or microphones provided at a location of a sporting event, or any other event, and mix that media content with any media content received from any of the creators 310-1 . . . 310-a or any of the listeners 380-1, 380-2 . . . 380-c. In such embodiments, the creators 310-1 . . . 310-a may act as sportscasters, news anchors, weathermen, reporters or others, and may generate a media program that combines audio or video content captured from a sporting event or other event of interest, along with audio or video content received from one or more of the creators 310-1 . . . 310-a or any of the listeners 380-1, 380-2 . . . 380-c before transmitting causing the media program to be transmitted to the listeners 380-1, 380-2 . . . 380-c by the conference system 350-2 or the broadcast system 350-3.

In some implementations, the conference system 350-2 may establish two-way communications channels between any of the creators 310-1 . . . 310-a and, alternatively, any of the listeners 380-1, 380-2 . . . 380-c, who may be invited or authorized to participate in a media program, e.g., by providing media content in the form of spoken or sung words, music, or any media content, subject to the control or discretion of the creators 310-1 . . . 310-a. Devices or systems connected to the conference system 350-2 may form a "conference" by transmitting or receiving information or data along such communication channels, or in any other manner. The operation of the mixing system 350-1, e.g., the establishment of connections, or the transmission and receipt of data via such connections, may be subject to the control or discretion of the creators 310-1 . . . 310-a. In some implementations, the mixing system 350-1 may effectively act as a virtual participant in such a conference, by transmitting media content received from any of the content sources 370-1, 370-2 . . . 370-b to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-c.

Likewise, the broadcast system 350-3 may be any server or other computer system or device configured to receive information or data from the mixing system 350-1, or transmit any information or data to any of the listeners 380-1, 380-2 . . . 380-*c* over the network 390. In some implementations, the broadcast system 350-3 may establish one-way communications channels with the mixing system 350-1 or any of the listeners 380-1, 380-2 . . . 380-*c* in accordance with a broadcast plan (or a sequence of media content, or another schedule), or at the direction of the creators 310-1 . . . 310-*a*. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-*a*.

The content sources 370-1, 370-2 . . . 370-*b* may be servers or other computer systems having media content stored thereon, or access to media content, that are configured to transmit media content to the creators 310-1 . . . 310-*a* or any of the listeners 380-1, 380-2 . . . 380-*c* in response to one or more instructions or commands from the creators 310-1 . . . 310-*a* or the mixing system 350-1. The media content stored on or accessible to the content sources 370-1, 370-2 . . . 370-*b* may include one or more advertisements, songs or media files, news programs, sports programs, weather reports or any other media files, which may be live or previously recorded. The number of content sources 370-1, 370-2 . . . 370-*b* that may be accessed by the mixing system 350-1, or the types of media content stored thereon or accessible thereto, is not limited.

The listeners 380-1, 380-2 . . . 380-*c* may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators 310-1 . . . 310-*a*, with any of the content sources 370-1, 370-2 . . . 370-*b*, or with any of the listeners 380-1, 380-2 . . . 380-*c*, as necessary, to compile and seamlessly transmit media programs over digital channels (e.g., web-based or application-based), to devices of the creators 310-1 . . . 310-*a* or the listeners 380-1, 380-2 . . . 380-*c* in accordance with a broadcast plan, or subject to the control of the creators 310-1 . . . 310-*a*. Furthermore, in some implementations, one or more of the listeners 380-1, 380-2 . . . 380-*c*, e.g., musicians, celebrities, personalities, athletes, politicians, or artists, may also be content sources. For example, where the broadcast system 350-3 has established one-way channels, e.g., broadcast channels, with any of the listeners 380-1, 380-2 . . . 380-*c*, the mixing system 350-1 may terminate one of the one-way channels with one of the listeners 380-1, 380-2 . . . 380-*c*, and cause the conference system 350-2 to establish a two-directional channel with that listener, thereby enabling that listener to not only receive but also transmit media content to the creators 310-1 . . . 310-*a* or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

Figure 4:
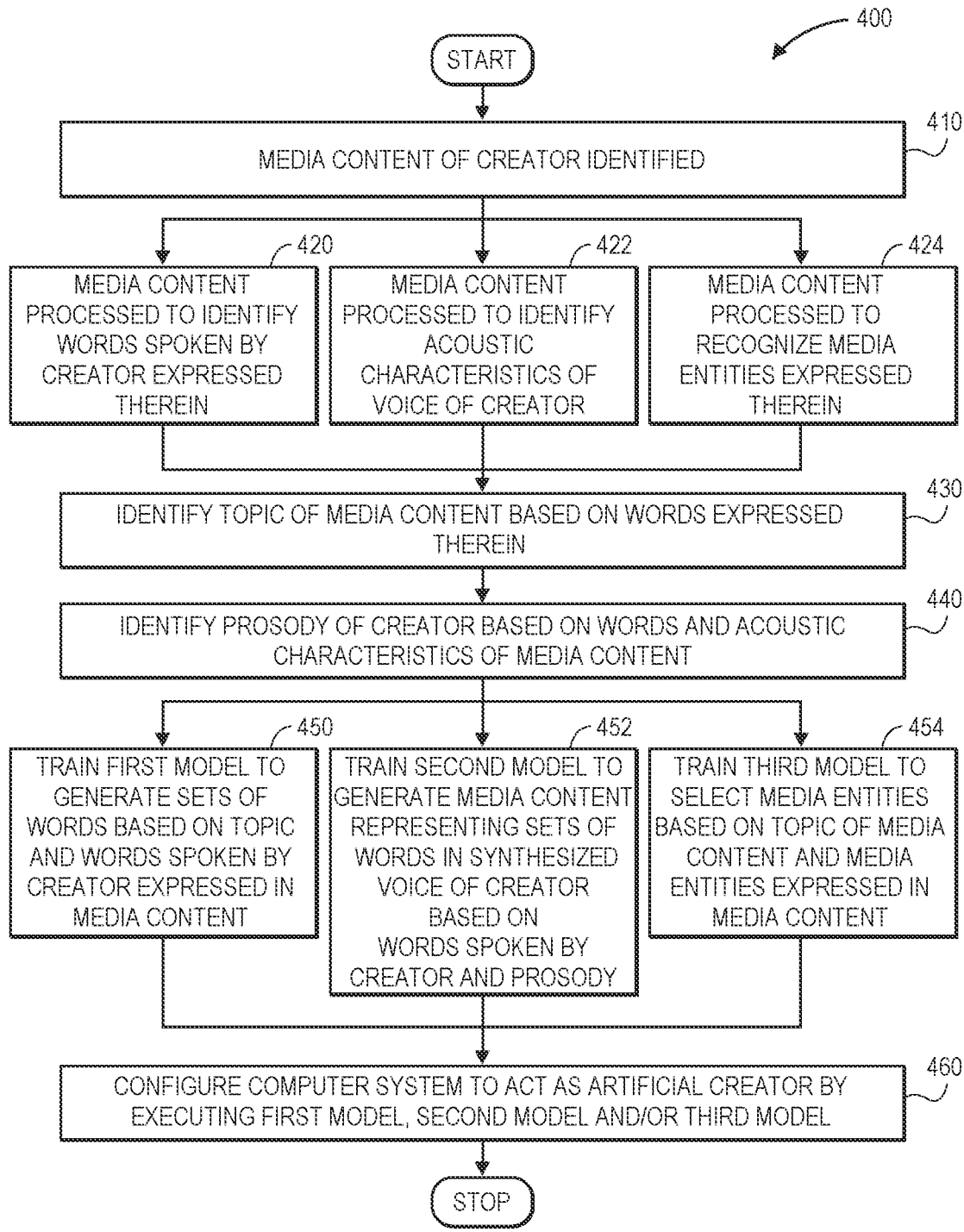
FIG. 4 is a flow chart of one process for generating media content in accordance with embodiments of the present disclosure.

Referring to FIG. 4, a flow chart 400 of one process for generating media content in accordance with embodiments of the present disclosure is shown.

At box 410, media content of a creator is identified. In some implementations, audio data representing the media content may have been captured by one or more microphones or other sensors of a computer device associated with a human creator or another participant, e.g., a mobile device, or retrieved from one or more sources of the media content. In some other implementations, audio data representing the media content may have been previously captured or retrieved at any time or for any reason, and recorded or otherwise stored in one or more data stores. The media content may be aired live, e.g., captured or retrieved by a control system or any other type or form of computer system in real time or in near-real time, and transmitted to devices of any number of listeners over one or more networks.

The media content may be arranged in sequences and may include any number of media entities (e.g., songs, podcasts or others) selected by the creator, as well as sets of words or phrases spoken or sung by the creator, or other guests or participants in a media programs, as well as any other content (e.g., advertisements, news, sports, weather, or others). Additionally, any type or form of information, data or metadata regarding the media content may be identified along with the media content. For example, such information, data or metadata may identify the creator, or any other participants in the media content, along with identifiers of types or forms of media content (e.g., media entities), transcripts of the media content, as well as times or durations at which the media content was transmitted to the devices of the listeners.

At box 420, the media content is processed to identify one or more spoken words of the creator expressed therein. For example, in some implementations, the media content may be separated into portions representing words that are spoken or sung by a creator or other participants, and other portions (e.g., media entities, advertisements, news, sports, weather, or others). The portions representing words spoken or sung by the creator or other participants may then be transcribed into one or more sets of text, e.g., by an NLP or NLU processing module, a speech recognition engine or module, or another processing module. In some implementations, transcripts of words spoken by the creator may have been previously identified and stored in association with the media content, e.g., in one or more files or records stored in association with the media content.

In parallel, at box 422, the media content is processed to identify acoustic characteristics of the voice of the creator. For example, the acoustic characteristics may include but need not be limited to fundamental frequencies (or pitches) of the voice of the creator, speech rates of the voice, intensities (or amplitudes) of the voice, or any other characteristics, and may be determined from the media content in any manner. In some implementations, a cepstrum analysis of the media content may be performed to determine acoustic characteristics of the media content, e.g., periodic structures of the media content, or dominant frequencies of the media content.

Also in parallel, at box 424, the media content is processed to recognize any media entities expressed therein. For example, in some implementations, media entities (e.g., songs, podcasts or others) may be identified by a recognition application, which may compare the media content to representations of other media content including media entities and attempt to match the media content to any of such media entities. A recognition application may be executed on the same computer device or system on which the media content is stored or received, or on any other computer device or system, and compare the media content to any data or representations of media entities in an effort to identify any matches, compressing or decompressing the media content as necessary. The media content may be matched to any media entities or otherwise identified based on acoustic characteristics of the media content and the media entities, e.g., spectrograms (or representations of frequencies over time), average zero crossing rates, estimated tempos, average spectra, spectral flatnesses, prominent tones across frequency bands, bandwidths, or others. Alternatively, the media entities may be identified based on information, data or metadata stored in association with the media content of the media programs.

At box 430, a topic of the media content is identified based on the words identified at box 420. For example, one or more sets of keywords representative of a topic (or a theme) of the media content may be identified by a topic model based on the words expressed in the media content. The topic model may be any type or form of algorithm, system or technique, e.g., a statistical model such as a latent Dirichlet application, configured to recognize or identify words that most uniquely describe attributes of the media content, and may be executed by a control system, or another computer system. In some implementations, audio data representing the media content may be provided directly to the topic model. Alternatively, sets of keywords representative of topics of media programs may be identified by any other model, or in any other manner.

At box 440, a prosody of the creator is identified based on the words identified at box 420 and the acoustic characteristics identified at box 422. For example, in some implementations, the prosody of the creator, or any linguistic styles of the creator, may be defined with respect to speaking patterns of the creator, e.g., observed choices of words, paces, pauses or others, and may represent idiolects or other unique aspects of speech of the creator. For example, the creator may speak in unique patterns of elements such as jokes, figures of speech, questions or other types or forms of speech. The prosody may also represent rhythms, stresses, intonations, or other attributes of speech of the creator, or any additional information beyond the words that were actually spoken or sung by the creator.

At box 450, a first model is trained to generate sets of words based on the topic identified at box 430 and the sets of words spoken by the creator identified at box 420. The sets of words may be selected in response to the sets of words spoken by the creator, and in a context of one or more of the sets of words. The contexts of the one or more sets of words may be determined by providing one or more of such sets to an NLP or NLU processing module. In parallel, at box 452, a second model is trained to generate media content representing sets of words in a synthesized voice of the creator based on the words spoken by the creator and the prosody identified based on the words identified at box 420. Alternatively, or additionally, the second model may be trained based on one or more of the acoustic characteristics identified at box 422. Also in parallel, at box 454, a third model is trained to select media entities based on the topic identified at box 430 and the media entities expressed in the media content identified at box 424.

In some implementations, one or more of the first model, the second model or the third model may be an algorithm, system or technique such as a generative adversarial network or another artificial neural network having an input layer, an output layer and one or more hidden layers that may operate subject to various activation functions defined with respect to nodes in each of such layers. The generative adversarial network or other artificial neural network may be of any type or form, such as a feedforward neural network or a recurrent neural network, and may be fully or partially connected.

Moreover, one or more of the first model, the second model or the third model may be trained in a supervised or unsupervised manner. In supervised learning, the model may be trained by a training set comprising at least one input of the data regarding the creators and the episodes and at least one target output of the data regarding the listenership or the listener interactivity for the input. Thus, a model may be trained to identify the target output, to within an acceptable level of error. In unsupervised learning of an identity function, such as that which is typically performed by a sparse autoencoder, target output of the training set is the input, and a model may be trained to recognize the input as such. In some implementations, a model may be trained by backpropagation to recognize an approximation of an identity function for an input, or to otherwise approximate the input. Such backpropagation algorithms may operate according to methods of steepest descent, conjugate gradient methods, or other like methods or techniques, in accordance with the systems and methods of the present disclosure.

In some other implementations, one or more of the first model, the second model or the third model may be a gradient-based model, a tree-based model, a learning model, a random forest, a gradient-boosting tree, or others. In still other implementations, the first model, the second model or the third model may be a transformer (e.g., a bidirectional encoder representation from transformers).

Those of ordinary skill in the pertinent art would recognize that any algorithm, system or technique may be used to train one or more layers of a model or another network. Likewise, any algorithm, system or technique may be used to determine and minimize errors in an output of such a model. Additionally, those of ordinary skill in the pertinent art would further recognize that the various layers of a model (e.g., a generative adversarial network or another artificial neural network) may be trained collectively, such as in a sparse autoencoder, or individually, such that each output from one hidden layer of the neural network acts as an input to a subsequent hidden layer.

At box 460, a computer system is configured to act as an artificial creator by executing at least one of the first model, the second model, or the third model, and the process ends. For example, an artificial creator may be an agent operated by a control system, or a computer device in communication with the control system, e.g., a content source, and may generate media content or identify one or more media entities to be transmitted to devices of listeners during a media program.

The artificial creator may receive inputs and generate or identify outputs that are consistent with any form of media content that may have been generated or identified by the creator. For example, the outputs may identify media entities (e.g., songs, podcasts, or others) that are consistent with media entities that are typically played by the creator during media programs and media content representing such media entities may be transmitted to devices of listeners during a media program accordingly. The outputs may also identify words or phrases that are consistent with words or phrases uttered by the creator during the media programs and media content representing such words or phrases, in synthesized voices having linguistic styles, prosodies or acoustic characteristics consistent with voices of the creator, may be transmitted to devices of listeners accordingly. Alternatively, the outputs may also identify media content such as advertisements, news, sports, weather or others that are consistent with media content typically selected by the creator and such media content may be transmitted to devices of listeners accordingly.

Moreover, in some implementations, the outputs may also identify labels or other attributes representing sequences of media content that are consistent with sequences of media content typically selected by the creator and media content may be transmitted to devices of listeners in such sequences accordingly. For example, the outputs may identify a sequence of one or more media entities, advertisements, reports (e.g., news, sports or weather), interviews with guests or other participants, or commentary. Audio data representing the media content may then be transmitted to devices of the listeners in accordance with such sequences.

In some implementations, a single machine learning model or any other algorithm, system or technique may be trained or configured to execute the functions of the first model described above with respect to box 450, the second model described above with respect to box 452 or the third model described above with respect to box 454. In such implementations, a computer system may be configured to act as an artificial creator by executing the single model.

Figure 5A:
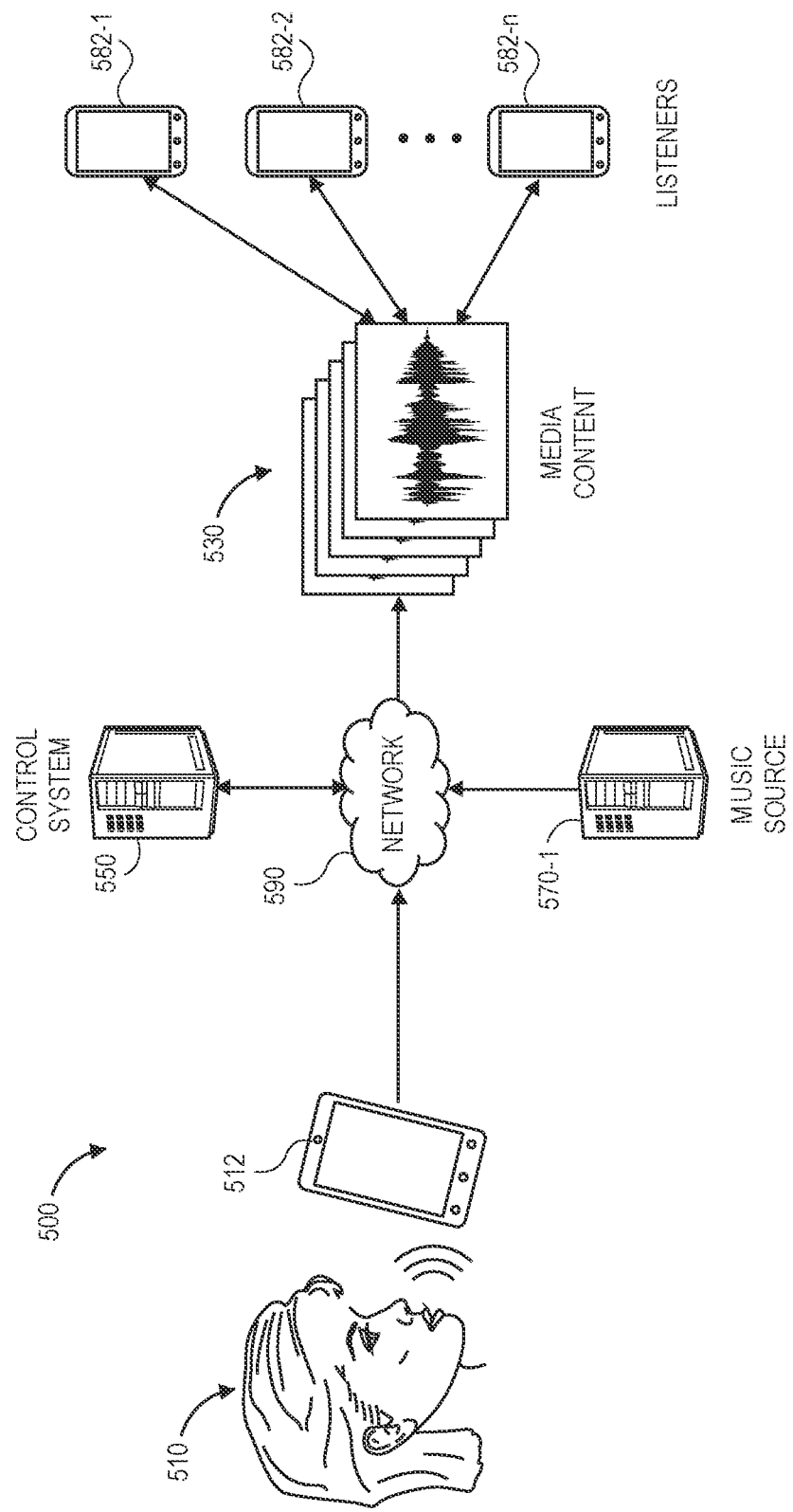
Figure 5B:
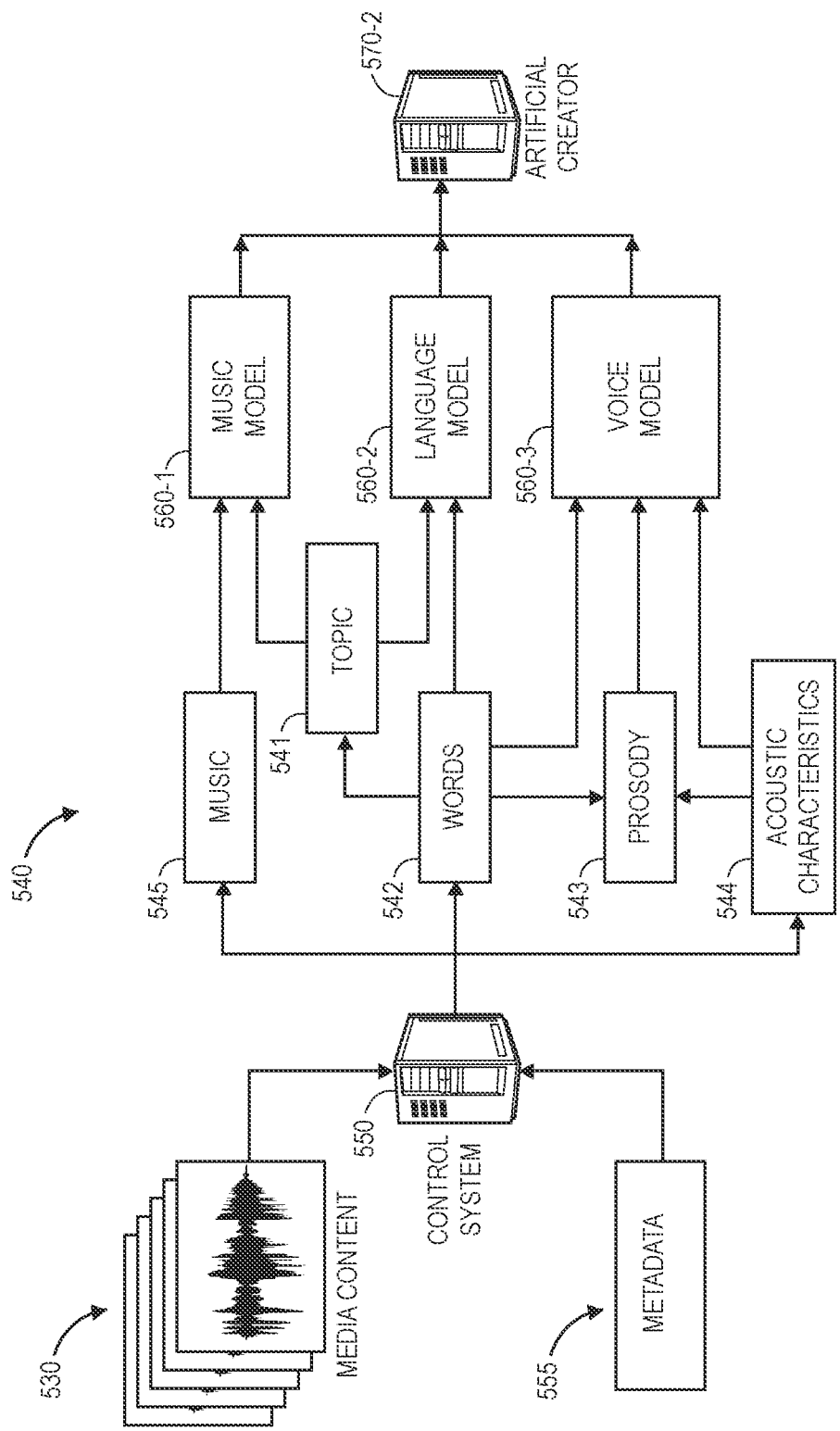

Artificial creators of the present disclosure may operate in lieu of, or alongside, a human creator in generating media content to be included in a media program. Referring to FIGS. 5A through 5C, views of aspects of one system for generating media content in accordance with embodiments of the present disclosure are shown. Except where otherwise noted, reference numerals preceded by the number "5" shown in FIGS. 5A through 5C indicate components or features that are similar to components or features having reference numerals preceded by the number "3" shown in FIG. 3, by the number "2" shown in FIG. 2A or FIG. 2B or by the number "1" shown in FIGS. 1A through 1G.

As is shown in FIG. 5A, a system 500 includes a computer device 512 (e.g., a mobile device, such as a smartphone or a tablet computer) of a creator 510 of a media program, a control system 550, a music source 570-1 and a plurality of devices 582-1, 582-2 . . . 582-n of listeners that are connected to one another over one or more networks 590, which may include the Internet in whole or in part.

When the creator 510 utters one or more sets of words or phrases, audio data representing the words or phrases is captured by sensors associated with a computer device 512 (e.g., a mobile device, such as a smartphone or a tablet computer) and transmitted to a control system 550 over the one or more networks 590. Likewise, when creator 510 identifies or selects one or more media entities (e.g., songs, podcasts or others) that are maintained or stored on the music source 570-1 for inclusion in the media program, e.g., using one or more user interfaces provided on the computer device 512 or by one or more spoken commands, the control system 550 retrieves audio the media entities from the music source 570. The control system 550 then causes media content 530 representing the sets of words or phrases of the creator 510 and the media entities selected by the creator 510 to be transmitted to the devices 582-1, 582-2 . . . 582-n over the one or more networks 590.

Additionally, as is shown in FIG. 5B, the control system 550 also processes the media content 530 and any associated metadata 555 to identify one or more sets of features 540 of the media content 530. The metadata 555 may include, but need not be limited to, one or more text-based descriptions of the media content 530, as well as any content-based ratings or classifications of the media content 530, e.g., viewer or listener ratings for maturity, as well as identifiers of any media entities included in the media content 530 or any other information or data regarding the media content 530, such as a transcript of all or a portion of the media content 530.

As is shown in FIG. 5B, the control system 550 processes the media content 530 and the metadata 555 to generate a transcript of words 542 represented in the media content 530, as well any acoustic characteristics 544 of the media content 530 and any identifiers of music 545 or other media entities represented in the media content 530. For example, the media content 530 may be transcribed in any manner, e.g., in real time or in near-real time, or at any other time, by automated speech recognition or any other techniques, to generate the transcript of the words 542 represented therein. Likewise, some or all of the media content 530 may be provided to a recognition application trained to match some or all of the media content 530 to words (e.g., lyrics) or music (e.g., notes, tempos, beats, rhythms or other characteristics) of media entities and to identify the music 545 or other media entities represented in the media content 530 that match such words or music.

Additionally, a topic 541 of the media content 530 is determined by providing the words 542 or any other information or data regarding the media content 530 to a topic model, such as a latent Dirichlet application, trained to generate a set of words (e.g., keywords) that most uniquely describe attributes of the media content 530, e.g., a topic (or a theme) of the media content 530.

Likewise, a prosody 543 of the creator 510 may also be determined from the words 542 and/or the acoustic characteristics 544. For example, the prosody 543 may identify any rhythms, stresses, intonations or other attributes of speech of the creator 510, based on the words 542 or any of the acoustic characteristics 544, such as fundamental frequencies (or pitches), speech rates, intensities (or amplitudes) of the creator 510 or others, which may be determined from the media content 530 or the metadata 555. Furthermore, the prosody 543 may also be determined based on the language chosen by the creator 510, as represented in the words 542 and modeled in any manner, to determine the prosody 543 or a linguistic style of the creator 510. For example, the words 542 may be modeled to identify choices of words, paces, pauses or other attributes of speech of the creator 510 and the prosody 543 may be identified accordingly.

The topic 541, the words 542, the prosody 543, the acoustic characteristics 544 or the music 545 and any other information or data regarding the media content 530 (e.g., the metadata 555) may be used to train a music model 560-1 to identify music or other media entities for use in a media program, a language model 560-2 to identify one or more sets of words that are consistent with or similar to words typically chosen by the creator 510, and a voice model 560-3 for generating media content or audio data for presenting words identified by the language model 560-2 in a synthesized voice that is consistent with or similar to a voice of the creator 510. The music model 560-1, the language model 560-2 or the voice model 560-3 may be a generative adversarial network or another artificial neural network having an input layer, an output layer and one or more hidden layers and may operate subject to various activation functions defined with respect to nodes in each of such layers. In some other implementations, the music model 560-1, one or more of the language model 560-2 or the voice model 560-3 may be a gradient-based model, a tree-based model, a learning model, a random forest, a gradient-boosting tree, or others. In still other implementations, one or more of the music model 560-1, the language model 560-2 or the voice model 560-3 may be a transformer (e.g., a bidirectional encoder representation from transformers).

As is shown in FIGS. 5B and 5C, once the music model 560-1, the language model 560-2 or the voice model 560-3 have been sufficiently trained, an artificial creator 570-2 may be programmed to execute the music model 560-1, the language model 560-2 or the voice model 560-3. The artificial creator 570-2 may be a server or another computer device or system configured to use the music model 560-1, the language model 560-2 or the voice model 560-3 to generate or select media content to be included in a media program.

For example, in some implementations, the artificial creator 570-2 may be configured to generate one or more sets of words or phrases to be uttered during the media program and transmit audio data for causing such sets of words or phrases to be played by devices 582-1, 582-2 . . . 582-n of the listeners, in voices having linguistic styles, prosodies or acoustic characteristics that match the linguistic style, the prosody or the acoustic characteristics of the voice of the creator 510. In some implementations, the artificial creator 570-2 may also identify one or more media entities to be played during a media program and may cause such media entities to be retrieved from the music source 570-1 and transmitted to the devices 582-1, 582-2 . . . 582-n. Therefore, in such implementations, the artificial creator 570-2 may effectively stand in for the creator 510 at times when the creator 510 requires a break of any duration or is unable or unavailable to generate or select media content for any other reason.

Alternatively, in some implementations, the artificial creator 570-2 may cooperate with the creator 510 to generate media content for use in a media program. For example, where the creator 510 utters one or more sets of words or phrases and audio data representing such words or phrases is captured by the computer device 512 and transmitted to the devices 582-1, 582-2 . . . 582-n, the artificial creator 570-2 may generate counterpart sets of words or phrases that are consistent with the sets of words or phrases uttered by the creator 510 and audio data representing the counterpart words or phrases may also be transmitted to the devices 582-1, 582-2 . . . 582-n. The creator 510 and the artificial creator 570-2 may thus engage in a virtual conversation that is shared with listeners via the devices 582-1, 582-2 . . . 582-n, with the artificial creator 570-2 responding to words or phrases of the creator 510 with counterpart words or phrases that are uttered in a voice having a linguistic style, a prosody and acoustic characteristics that are counterparts to a linguistic style, a prosody and acoustic characteristics of a voice of the creator 510.

Figure 6A:
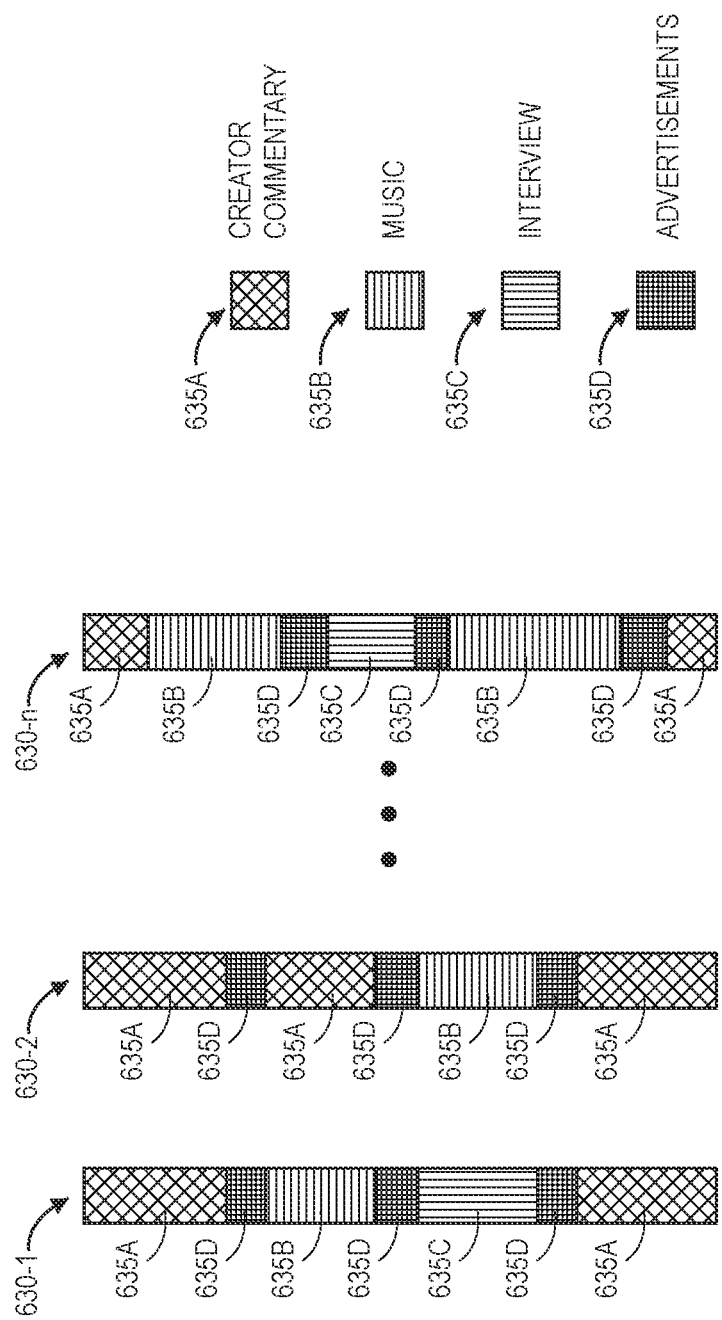

One or more artificial creators of the present disclosure may also be trained to generate or select sequences of media content of any type or form based on sequences of media content (e.g., episodes of media programs, or any other media content) previously generated or selected by one or more creators. Referring to FIGS. 6A through 6C, views of aspects of one system for generating media content in accordance with embodiments of the present disclosure are shown. Except where otherwise noted, reference numerals preceded by the number "6" shown in FIGS. 6A through 6C indicate components or features that are similar to components or features having reference numerals preceded by the number "5" shown in FIGS. 5A through 5C, by the number "3" shown in FIG. 3, by the number "2" shown in FIG. 2A or FIG. 2B or by the number "1" shown in FIGS. 1A through 1G.

As is shown in FIG. 6A, a plurality of sequences 630-1, 630-2 . . . 630-n of media content associated with a creator include media content of various types or forms. In some implementations, each of the sequences 630-1, 630-2 . . . 630-n may be an episode of a media program that is aired on a recurring or a non-recurring basis. For example, the sequence 630-1 includes a period of creator commentary 635A, followed by a period including one or more advertisements 635D, and a period of music 635B. The sequence 630-1 further includes another period including one or more advertisements 635D and a period including an interview 635C, followed by yet another period including one or more advertisements 635D and another period of creator commentary 635A. Each of the periods of the sequence 630-1, and the sequence 630-1 itself, may have any length or duration.

The sequence 630-2 further includes three periods of creator commentary 635A and a period of music 635B, separated by periods including one or more advertisements 635D. The sequence 630-n also includes a period of creator commentary 635A, followed by a period of music 635B, a period including one or more advertisements 635D, a period including an interview 635C, another period including one or more advertisements 635D, another period including music 635C and yet another period including one or more advertisements 635D, before concluding with a period of creator commentary 635A.

As is shown in FIG. 6B, a control system 650 (or another computer device or system) may use information or data representing the sequences 630-1, 630-2 . . . 630-n and the media content included therein to train a model 660 to generate or select sequences of media content on behalf of one or more creators. The model 660 may be a generative adversarial network or any other artificial neural network. Once the model 660 has been trained, a computer device or system may be programmed or configured to act as an artificial creator 670-1 and execute the model 660. Alternatively, the information or data representing the sequences 630-1, 630-2 . . . 630-n and the media content included therein may be used to train multiple models and the artificial creator 670-1 may be programmed or configured to execute such models accordingly.

For example, as is shown in FIG. 6C, where the artificial creator 670-1 has been trained based on the information or data representing the sequences 630-1, 630-2 . . . 630-n and the media content included therein, the artificial creator 670-1 may generate another sequence 630-(n+1) of media content that is consistent with or similar to one or more of the other sequences 630-1, 630-2 . . . 630-n of media content, and transmit media content in accordance with the sequence 630-(n+1) to devices 682-1, 682-2 . . . 682-m of any number of listeners. For example, the sequence 630-(n+1) includes a period of creator commentary 635A, followed by a pair of periods of one or more advertisements 635D and creator commentary 635A. Media content to be aired during the periods of creator commentary 635A may represent more sets of words generated by the artificial creator 670-1, in a synthesized voice that is consistent with or similar to a voice of a creator. Alternatively, or additionally, the sequence 630-(n+1) may further include one or more media entities retrieved from the music source 670-2, or any other media content retrieved from any other source.

Figure 7A:
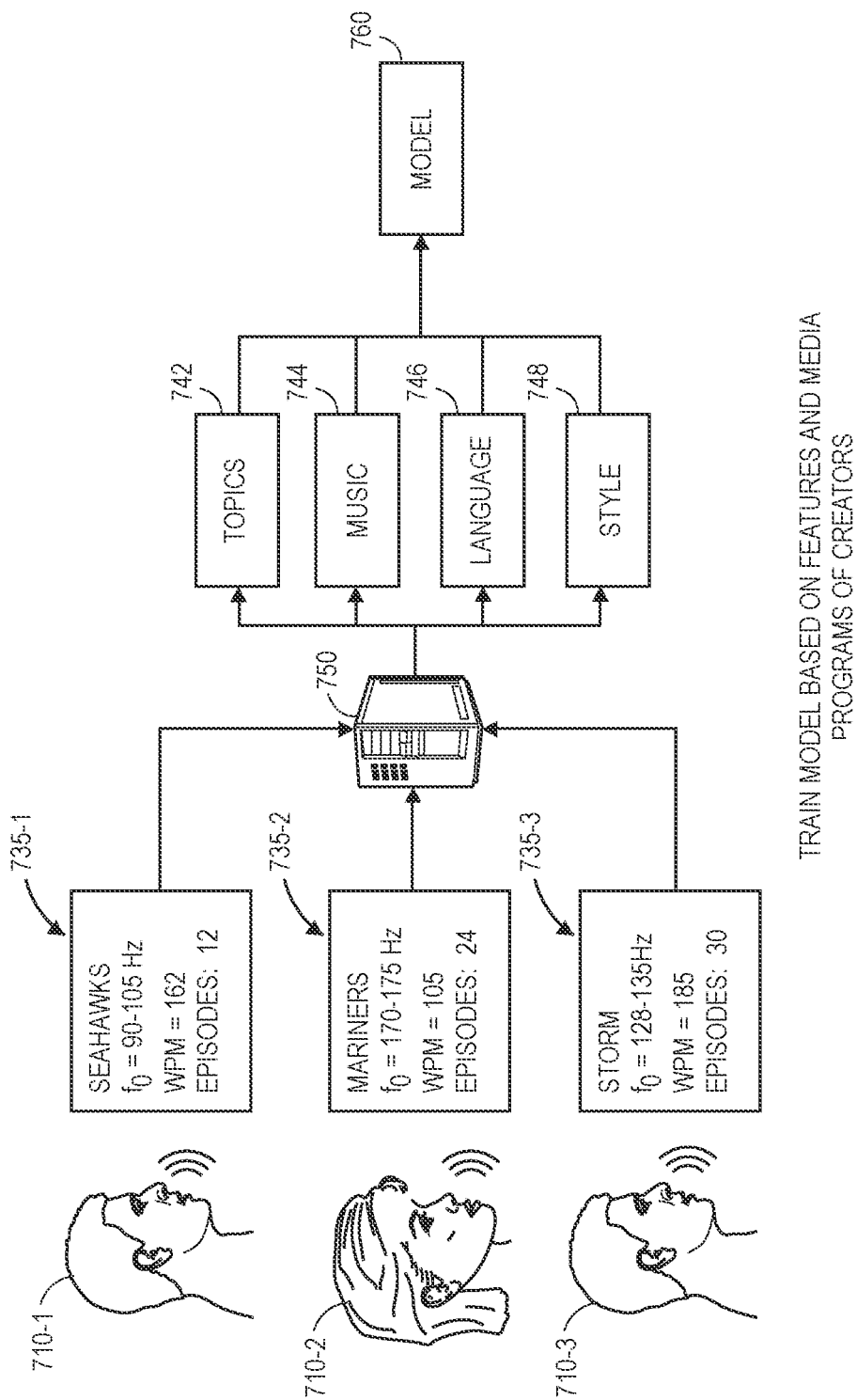

An artificial creator may generate or select media content using one or more models that are trained based on themes, media entities, linguistic styles, prosodies or other attributes of multiple human creators. Referring to FIGS. 7A and 7B, views of aspects of one system for generating media content in accordance with embodiments of the present disclosure are shown. Except where otherwise noted, reference numerals preceded by the number "7" shown in FIGS. 7A and 7B indicate components or features that are similar to components or features having reference numerals preceded by the number "6" shown in FIGS. 6A through 6C, by the number "5" shown in FIGS. 5A through 5C, by the number "3" shown in FIG. 3, by the number "2" shown in FIG. 2A or FIG. 2B or by the number "1" shown in FIGS. 1A through 1G.

As is shown in FIG. 7A, a control system 750 receives media content 735-1, 735-2, 735-3 respectively generated by a plurality of creators 710-1, 710-2, 710-3. For example, the media content 735-1 generated by the creator 710-1 includes twelve episodes of a media program relating to the Seahawks professional football team, which is based in Seattle. Speech of the creator 710-1 represented in the media content 735-1 has a fundamental frequency, or $f_0$, in a range between ninety and one hundred five Hertz (90-105 Hz) and a speech rate of approximately one hundred sixty-two words per minute. The media content 735-2 generated by the creator 710-2 includes twenty-four episodes of a media program relating to the Mariners professional baseball team, which is also based in Seattle. Speech of the creator 710-2 represented in the media content 735-2 has a fundamental frequency, or $f_0$, in a range between one hundred seventy and one hundred seventy-five Hertz (170-175 Hz) and a speech rate of approximately one hundred five words per minute. The media content 735-3 generated by the creator 710-3 includes thirty episodes of a media program relating to the Storm professional basketball team, which is also based in Seattle. Speech of the creator 710-3 represented in the media content 735-3 has a fundamental frequency, or $f_0$, in a range between one hundred twenty-eight and one hundred thirty-five Hertz (128-135 Hz) and a speech rate of approximately one hundred eighty-five words per minute.

As is further shown in FIG. 7A, the control system 750 processes the media content 735-1, 735-2, 735-3 to identify one or more topics (or themes) 742 of the media programs of the creators 710-1, 710-2, 710-3, e.g., by providing some or all of the media content 735-1, 735-2, 735-3, or a transcript of words or phrases represented therein, to a topic model or other algorithm, system, or technique, e.g., a latent Dirichlet application. The control system 750 also identifies one or more media entities 744, e.g., music or any other sounds, represented in the media content 735-1, 735-2, 735-3, e.g., by providing the media content 735-1, 735-2, 735-3 to a recognition application trained to match any portions of the media content 735-1, 735-2, 735-3 to words (e.g., lyrics) or music (e.g., notes, tempos, beats, rhythms or other characteristics) of media entities, and to identify any media entites represented in the media content 735-1, 735-2, 735-3 accordingly.

The control system 750 further identifies one or more attributes of language 746 used by the creators 710-1, 710-2, 710-3 during the media program, as represented in the media content 735-1, 735-2, 735-3. For example, portions of the media program that represent words or phrases uttered by the creators 710-1, 710-2, 710-3 or, alternatively, any other participants in the media programs, may be processed to identify the words or phrases. The control system 750 identifies one or more attributes of styles 748 of the creators 710-1, 710-2, 710-3. Such attributes may identify or represent linguistic styles (e.g., speaking patterns, observed choices of words, paces, pauses or others), prosodies (e.g., rhythms, stresses, intonations or other attributes of speech), and any acoustic characteristics (e.g., fundamental frequencies or pitches, speech rates, intensities or amplitudes), or any other characteristics. The attributes of the styles 748 may be determined from the media content 735-1, 735-2, 735-3 in any manner.

As is also shown in FIG. 7A, the control system 750 trains one or more models 760 based on features of the media programs and the creators 710-1, 710-2, 710-3, viz., the topics 742, the music 744, the language 746 and the styles 748. Because the model 760 may be trained based on media content of each of a plurality of creators 710-1, 710-2, 710-3, the model 760 may be used to generate media content consistent with media content generated by the plurality of creators 710-1, 710-2, 710-3, and the media content may be played by devices of listeners in voices having linguistic styles, prosodies or acoustic characteristics that are similar to the voices of the creators 710-1, 710-2, 710-3.

As is shown in FIG. 7B, an artificial creator 770, e.g., a computer system programmed to execute the model 760, generates media content 735-4 that is consistent with media content typically generated by the creators 710-1, 710-2, 710-3, e.g., the media content 735-1, 735-2, 735-3 shown in FIG. 7A, and transmits the media content 735-4 to devices 782-1, 782-2 . . . 782-$n$ of a plurality of listeners over one or more networks 790 in accordance with a media program. As is shown in FIG. 7B, the media content 735-4 includes a set of words regarding sports in Seattle, viz., "welcome to Seattle Sports Radio, where we'll talk Storm, Mariners, 'Hawks and Kraken," that, when played by the devices, have a fundamental frequency, or $f_0$, of one hundred forty Hertz (140 Hz), and a speech rate of one hundred sixty words per minute. The set of words is consistent with the media content 735-1, 735-2, 735-3, in that the topic of the media content 735-4, or Seattle sports, relates to the topics of each of the media content 735-1, 735-2, 735-3. Moreover, the fundamental frequency of the media content 735-4 and the speech rate of the media content 735-4 are consistent with the fundamental frequencies or the speech rates of the media content 735-1, 735-2, 735-3. Alternatively, an artificial creator, such as the artificial creator 770, may generate media content that is deemed consistent with or similar to media content generated by one or more human creators on any other basis.

Figure 8:
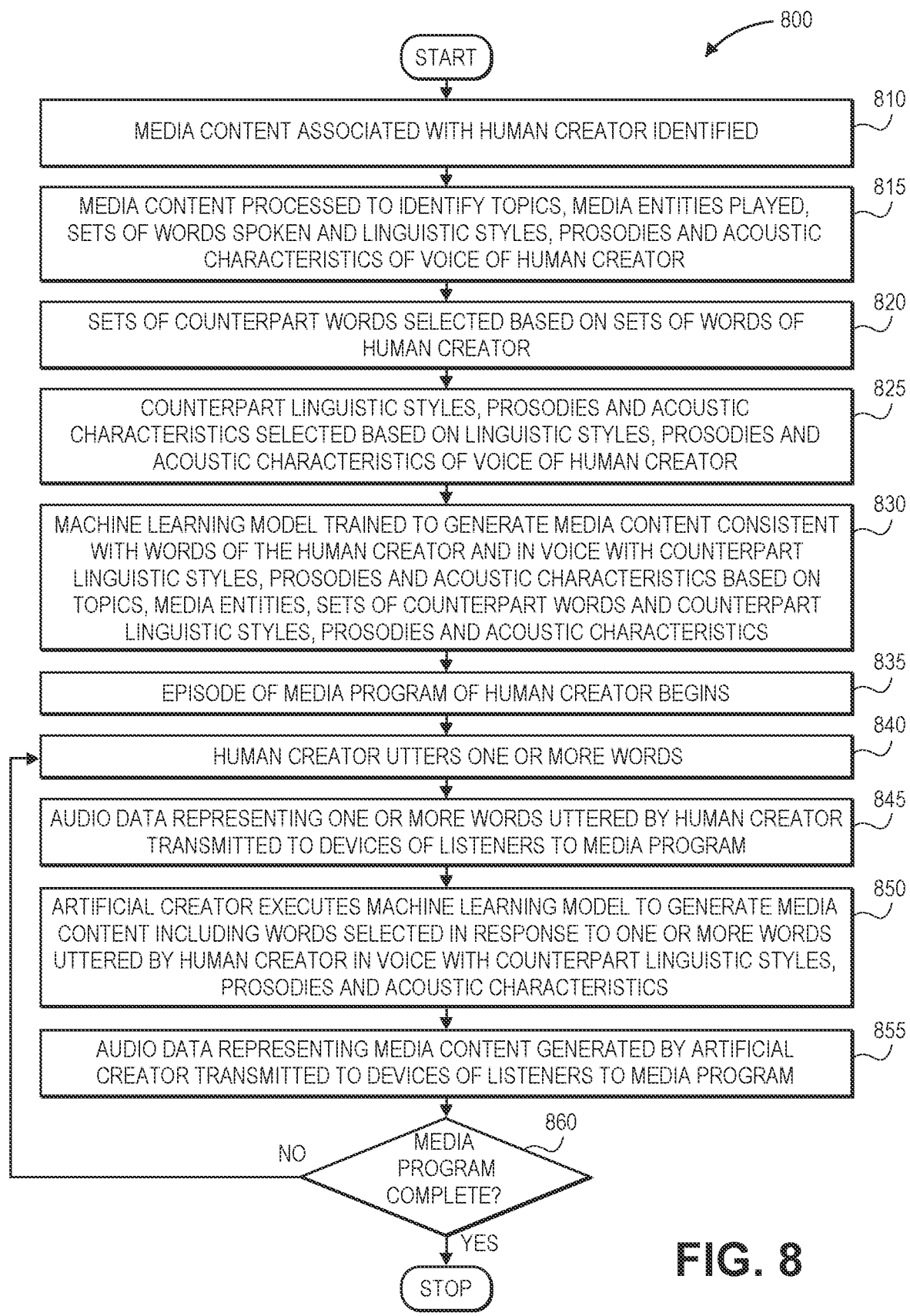
FIG. 8 is a flow chart of one process for generating media content in accordance with embodiments of the present disclosure.

As is discussed above, an artificial creator of the present disclosure may act as a counterpart to a human creator and engage in conversation with the human creator during a media program by selecting sets of words or phrases in response to words or phrases uttered by the human creator. Referring to FIG. 8, a flow chart 800 of one process for generating media content in accordance with embodiments of the present disclosure is shown. At box 810, media content associated with a human creator is identified. For example, the media content may include or represent words or phrases spoken or sung by the human creator, alone or with any other participants, or media entities (e.g., songs, podcasts or others) selected by the human creator. In some implementations, the media content associated with the human creator may have been aired in one or more episodes of a media program. Alternatively, the media content identified at box 810 need not have been included in any previously aired episode of any media program, and may have been generated in any other manner or at any other time.

At box 815, the media content is processed to identify topics, media entities played, sets of words spoken by the human creator, and linguistic styles, prosodies or acoustic characteristics of the human creator, or any other information or data regarding the media content. For example, the media content may be processed to identify one or more sets of words spoken or sung by the human creator or others and topics of the media content may be determined from such sets of words or in any other manner. Additionally, any media entities selected by the human creator may be identified, along with linguistic styles of the human creator, prosodies of the human creator, or one or more acoustic characteristics of the human creator. In some implementations, one or more of the topics, media entities, sets of words or phrases, linguistic styles, prosodies or acoustic characteristics may be identified in any other manner, such as based on information, data or metadata stored in association with the media content.

At box 820, a set of counterpart words may be selected based on the sets of words of the human creator. In some implementations, the sets of counterpart words may be within the topics identified at box 815, or may relate to such topics. For example, where one of the sets of words is "baseball," the set of counterpart words may include "ballpark," "infield," "outfield," "pitcher," "hitter," "fielder," or others relating to baseball. Where one of the sets of words is "computer," the set of counterpart words may include "laptop," "desktop," "mobile," "printer," "scanner," or others relating to computers. Where one of the sets of words is "kitchen," the set of counterpart words may include "appliance," "cabinet," "oven," "stove," "silverware," "cooking," or others relating to kitchens. The sets of counterpart words may include any nouns, adjectives, adverbs, verbs or other parts of speech as well as slang, phrases or common or proper terms. The scope of words that may be included in a set of counterpart words selected based on a set of words typically used by a human creator is not limited.

At box 825, counterpart linguistic styles, prosodies and acoustic characteristics are selected based on the linguistic styles, prosodies or acoustic characteristics identified at box 815. For example, as is discussed above, one or more representations of styles, prosodies or acoustic characteristics of a given creator may be identified based on the media content, which may be transcribed into sets of words or otherwise processed to identify any acoustic characteristics of the creator, as well as a topic, a prosody or any other information regarding the creator.

At box 830, a machine learning model is trained to generate media content that is consistent with the counterpart words, and in voices having the counterpart linguistic styles, prosodies or acoustic characteristics. The model may be any type of algorithm, system or technique, such as a generative adversarial network or any other artificial neural network, that may be trained in any other manner to identify sets of words based on sets of words of a creator, or to generate media content including audio data representing such sets of words spoken in a synthesized voice having the counterpart linguistic styles, prosodies and acoustic characteristics selected at box 825. For example, the model may be trained to generate media content representing words in a synthesized voice having features that may be different from but are compatible with a voice of the human creator. Such features may include, but need not be limited to, quantitative features such as fundamental frequencies (or pitches), speech rates, or intensities (or amplitudes), as well as qualitative features such as dialects, idiolects, choices of words, rhythms, stresses, intonations or others.

At box 835, an episode of a media program of the human creator begins. For example, at a scheduled time associated with the media program, or at a random time, one or more connections may be established between a control system and a device of a human creator, and between the control system and devices of listeners to the media program. In some implementations, a two-way communication channel may be established between a control system and a computer device (e.g., a mobile device, or any other device) of the human creator, thereby enabling the human creator to transmit audio data representing words that are spoken, sung or otherwise created by the human creator to the control system and to receive audio data from the control system. Likewise, one-way communication channels may be established between the control system and each of the devices of the listeners, thereby enabling the listeners to receive audio data from the control system, by way of such devices. In some implementations, the connections may be established by or between multiple systems, such as a conference system, a mixing system, a broadcast system, or any other systems, alone or in addition to a control system. Moreover, in some implementations, connections may be established between a control system (or any other systems) and devices or systems of other participants in the media program, e.g., sources of advertisements, music, news, sports, weather, or other programming, or humans other than the human creator or any listeners.

At box 840, the human creator utters one or more words, e.g., to a mobile device (or another device or system) and at box 845, audio data representing the one or more words uttered by the human creator are transmitted to devices of the listeners to the media program. For example, where the words uttered by the creator are captured by one or more microphones or other sensors of a computer device of the creator, the computer device transmits audio data or other media content representing the words to a control system, which may transmit some or all of the audio data or media content to one or more devices of listeners to the media program.

At box 850, an artificial creator executing the machine learning model trained at box 830 generates media content representing words selected in response to the one or more words uttered by the human creator and in a voice with the counterpart linguistic styles, prosodies and acoustic characteristics selected at box 825. For example, the audio data representing the words uttered by the human creator may be processed to identify the words expressed therein, along with any acoustic characteristics of the human creator and any media entities (e.g., songs, podcasts or other content) represented therein. The words may be further processed to identify a topic of the words uttered by the human creator. The topic and the words uttered by the human creator may be provided as inputs to the model trained at box 830, which is trained to generate media content representing a set of words to be uttered in response to the words uttered by the human creator and in a synthesized voice that acts as a counterpart to a voice of the creator. The words may be selected in a context of the one or more words uttered by the human creator.

At box 855, audio data representing the media content generated by the artificial creator is transmitted to the devices of the listeners to the media program, concurrently with or after some or all of the audio data representing the words uttered by the human creator at box 845.

At box 860, whether the episode of the media program is complete is determined. If the episode of the media program is not complete, then the process returns to box 840, where the human creator utters one or more other words, and to box 845, where audio data representing the one or more other words uttered by the human creator are transmitted to the devices of the listeners to the media program. The artificial creator executing the machine learning model trained at box

830 may then generate media content representing a set of words to be uttered in response to the one or more other words uttered by the creator at box 840, and audio data representing the one or more other words may be transmitted to the devices to the listeners at box 855. If the media program is complete, however, then the process ends.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio files, the systems and methods disclosed herein are not so limited, and the media programs described herein may include any type or form of media content, including not only audio but also video, which may be transmitted to and played on any number of devices of any type or form.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 4 and 8, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A first computer system comprising at least one data store and at least one computer processor,
   wherein the first computer system is connected to one or more networks, and
   wherein the at least one data store has one or more sets of instructions stored thereon that, when executed by the at least one computer processor, cause the first computer system to perform a method comprising:

receiving first media content from a second computer system associated with a creator of a media program, wherein the first media content represents at least a first set of words;

receiving second media content from a third computer system associated with a media source;

causing at least the first media content and the second media content to be transmitted to at least a fourth computer system associated with a listener in accordance with a media program;

processing at least the first media content to identify at least the first set of words;

determining a topic of the media program based at least in part on the first set of words;

determining information regarding at least one of a prosody of the creator or an acoustic characteristic of the creator based at least in part on the first media content;

identifying at least a first media entity expressed in the second media content;

training at least a first machine learning model using at least the first set of words, the topic, the first media entity, and the information regarding the at least one of the prosody of the creator or the acoustic characteristic of the creator;

selecting, by the first machine learning model, at least one of a second set of words or a second media entity based at least in part on at least one output received from the first machine learning model; and causing at least third media content to be transmitted to at least the fourth computer system in accordance with the media program, wherein the third media content represents the at least one of the second set of words or the second media entity.

2. The first computer system of claim 1, wherein selecting the at least one of the second set of words or the second media entity comprises:

determining, based at least in part on the at least one output received from the first machine learning model, a sequence of media content to be transmitted to at least the third computer system, wherein the sequence of media content comprises:

the third media content, wherein the third media content represents the second set of words presented in at least one of the prosody of the creator or the acoustic characteristic of the creator; and fourth media content, wherein the fourth media content represents the second media entity, and wherein causing at least the third media content to be transmitted to at least the third computer system in accordance with the media program comprises:

causing the third media content and the fourth media content to be transmitted to at least the third computer system in accordance with the sequence.

3. The first computer system of claim 1, wherein the third media content represents the second set of words, wherein each of the second set of words is consistent with the topic of the media program, and wherein the third media content, when played by the third computer system, presents the second set of words in at least one of the prosody of the creator or the acoustic characteristic of the creator.

4. The first computer system of claim 1, wherein the information regarding the at least one of the prosody of the creator or the acoustic characteristic of the creator identifies at least one of:

a rate of speech of the creator;
a fundamental frequency of the creator; or
an intensity of speech of the creator.

5. The first computer system of claim 1, wherein determining the topic of the media program comprises:

providing at least the first set of words as an input to a latent Dirichlet allocation executed by the first computer system;

receiving an output from the latent Dirichlet allocation; and determining the topic of the media program based at least in part on the output.

6. A method comprising:

receiving, by at least a first computer system from a second computer system, first data representing first media content, wherein the second computer system is associated with a first creator of a first episode of a first media program, and wherein the first media content represents at least a first set of words spoken by the first creator during the first episode of the first media program;

transmitting, by at least the first computer system, second data to at least a third computer system in accordance with the first episode of the first media program, wherein the second data comprises at least some of the first data, and wherein the third computer system is associated with one of a plurality of listeners to the first episode of the first media program;

determining, based at least in part on the first data, at least one of:

the first set of words;
a first topic of the first episode;
a first prosody of the first creator; or
a first acoustic characteristic of the first creator;

identifying, by at least the first computer system, a second set of words based at least in part on at least one of the first set of words gr the first topic;

selecting at least one of a second prosody or a second acoustic characteristic based at least in part on the first media content, wherein the at least one of the second prosody or the second acoustic characteristic is consistent with at least one of the first prosody or the first acoustic characteristic;

generating, by at least the first computer system, second media content representing the second set of words based at least in part on the second prosody or the second acoustic characteristic, wherein the second media content represents the second set of words with the at least one of the second prosody or the second acoustic characteristic;

transmitting, by at least the first computer system to at least one of the third computer system or a fourth computer system, third data representing the second media content, wherein the fourth computer system is associated with at least one of:

one of the plurality of listeners to the first episode of the first media program;

one of a plurality of listeners to a second episode of the first media program; or one of a plurality of listeners to an episode of a second media program.

7. The method of claim 6, further comprising:

identifying, by at least the first computer system, a sequence of media content comprising:

a first one of the second set of words or a second media entity; and a second one of the second set of words or the second media entity; and after transmitting the third data representing the second media content to the at least one of the third computer system or the fourth computer system, transmitting, by at least the first computer to the at least one of the third computer system or the fourth computer system, fourth data representing third media content, wherein the third media content represents the first one of the second set of words or the second media entity, wherein the fourth media content represents the second one of the second set of words or the second media entity.

8. The method of claim 6, wherein determining the at least one of the first set of words, the first topic, the first media entity, the first prosody or the first acoustic characteristic comprises:

identifying, by at least the first computer system, the first set of words based at least in part on the first data; and determining, by at least the first computer system, the first topic of the first episode by a topic model based at least in part on the first set of words, wherein identifying the at least one of the second set of words or the second media entity comprises:

identifying, by at least the first computer system, the second set of words, wherein each of the second set of words is consistent with the first topic, and wherein the second media content represents the second set of words.

9. The method of claim 6, wherein selecting the at least one of the second prosody or the second acoustic characteristic comprises:

performing a cepstrum analysis of at least a portion of the first media content, wherein the at least one of the second prosody or the second acoustic characteristic is selected based at least in part on the cepstrum analysis of at least the portion of the first media content.

10. The method of claim 6, wherein the first prosody is at least one of a rhythm of speech, a pattern of stresses of speech, or a pattern of intonations of speech of the first creator, and wherein the second media content represents the second set of words in the first prosody.

11. The method of claim 6, wherein the first acoustic characteristic is one of:
a fundamental frequency of the first creator;
a speech rate of the first creator; or
an intensity of speech of the first creator,
wherein the second media content represents the second set of words with the first acoustic characteristic.

12. The method of claim 6, wherein the third data is transmitted to at least the third computer system in accordance with the first media program.

13. The method of claim 6, wherein the third data is transmitted to at least the fourth computer system in accordance with the episode of the second media program.

14. The method of claim 6, further comprising:

prior to receiving the first data representing the first media content, identifying, by at least the first computer system, third media content of a third media program, wherein the third media content represents at least a third set of words spoken by one of the first creator or a second creator during a third episode of the third media program and a third media entity selected by the one of the first creator or the second creator;

determining, based at least in part on the third media content, at least one of:
the third set of words;
a second topic of the third episode;
the third media entity;
one of the first prosody of the first creator or a second prosody of the second creator; or
one of the first acoustic characteristic of the first creator or a second acoustic characteristic of the second creator; and training, by at least the first computer system, at least one machine learning model based at least in part on at least one of the third set of words, the second topic, the third media entity, the one of the first prosody or the second prosody, or the one of the first acoustic characteristic or the second acoustic characteristic, wherein identifying the at least one of the second set of words or the second media entity comprises:

providing at least one of the first topic, the first media entity, the first prosody or the first acoustic characteristic to the at least one machine learning model as inputs; and receiving at least one output from the at least one machine learning model in response to the inputs, wherein the at least one of the second set of words or the second media entity is identified based at least in part on the at least one output.

15. The method of claim 14, further comprising:
prior to receiving the first data representing the first media content, identifying, by at least the first computer system, fourth media content of a fourth media program, wherein the fourth media content represents at least a fourth set of words spoken by a third creator during a fourth episode of the fourth media program and a fourth media entity selected by the third creator; and determining, based at least in part on the fourth media content, at least one of:
the fourth set of words;
a third topic of the fourth episode;
the fourth media entity;
a third prosody of the third creator; or
a third acoustic characteristic of the third creator,
wherein the at least one machine learning model is trained based at least in part on the fourth set of words, the third topic, the fourth media entity, the third prosody or the third acoustic characteristic.

16. The method of claim 14, wherein the at least one machine learning model comprises at least one of:
an artificial neural network;
a generative adversarial network;
a gradient-based model;
a tree-based model;
a learning model;
a random forest;
a gradient-boosting tree; or
a bidirectional encoder representation from transformers.

17. The method of claim 6, wherein the second computer system is at least one component of one of an automobile, a desktop computer, a laptop computer, a media player, a smartphone, a smart speaker, a tablet computer, a television, or a wristwatch.

* * * * *